United States Patent
Kouyama

(10) Patent No.: US 11,353,763 B2
(45) Date of Patent: Jun. 7, 2022

(54) PHASE MODULATION DEVICE AND DISPLAY APPARATUS

(71) Applicant: SONY SEMICONDUCTOR SOLUTIONS CORPORATION, Kanagawa (JP)

(72) Inventor: Yoshiaki Kouyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/052,091

(22) PCT Filed: Apr. 16, 2019

(86) PCT No.: PCT/JP2019/016264
§ 371 (c)(1),
(2) Date: Oct. 30, 2020

(87) PCT Pub. No.: WO2019/220841
PCT Pub. Date: Nov. 21, 2019

(65) Prior Publication Data
US 2021/0141261 A1 May 13, 2021

(30) Foreign Application Priority Data
May 15, 2018 (JP) .............................. JP2018-093717

(51) Int. Cl.
*G02F 1/137* (2006.01)
*G02F 1/1335* (2006.01)

(52) U.S. Cl.
CPC ...... *G02F 1/13731* (2013.01); *G02F 1/13787* (2021.01); *G02F 1/133531* (2021.01)

(58) Field of Classification Search
None
See application file for complete search history.

(56) References Cited

U.S. PATENT DOCUMENTS

2002/0135729 A1* 9/2002 Tokita ............... G02F 1/133504
349/172
2015/0338631 A1 11/2015 Matsumoto et al.

FOREIGN PATENT DOCUMENTS

CN 104823096 A 8/2015
EP 2927728 A1 10/2015
(Continued)

OTHER PUBLICATIONS

International Search Report and Written Opinion of PCT Application No. PCT/JP2019/016264, dated May 28, 2019, 06 pages of ISRWO.

(Continued)

*Primary Examiner* — Ashok Patel
(74) *Attorney, Agent, or Firm* — Chip Law Group

(57) ABSTRACT

A phase modulation device of the present disclosure includes: a light source; and an optical phase modulation element including a plurality of pixels in each of which liquid crystal molecules are arrayed, and including a plurality of pixel regions each including the plurality of pixels, the optical phase modulation element modulating, for each of the pixels, a phase of incident light entering the plurality of pixel regions from the light source. The optical phase modulation element includes, as the plurality of pixel regions, at least one first alignment region where an alignment direction of the liquid crystal molecules is a first direction parallel with a polarization axis of the incident light, and at least one second alignment region where an alignment direction of the liquid crystal molecules is a second direction parallel with the polarization axis of the incident light and different from the first direction by 180 degrees.

13 Claims, 16 Drawing Sheets

(56) References Cited

FOREIGN PATENT DOCUMENTS

| JP | 61-51124 A | 3/1986 |
|----|------------|--------|
| JP | 61-51125 A | 3/1986 |
| JP | 2016-099494 A | 5/2016 |
| WO | 2014/084007 A1 | 6/2014 |

OTHER PUBLICATIONS

Hermerschmidt, et al., "Wave Front Generation using a Phase-only Modulating Liquid-Crystal-based Micro-Display with HDTV resolution", Proceedings of SPIE, the International Society for Optical Engineering, vol. 6584, May 16, 2007, 10 pages.

* cited by examiner

[FIG. 1]
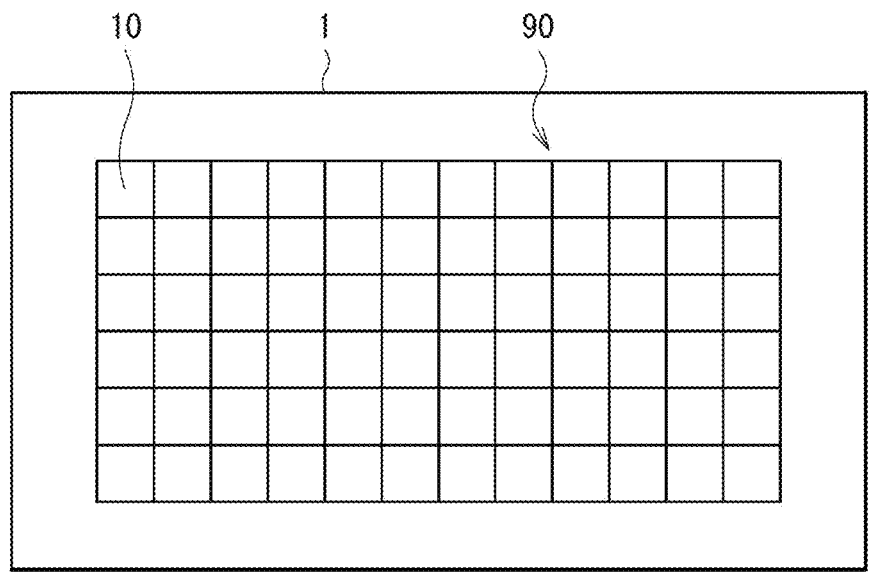
[FIG. 2]
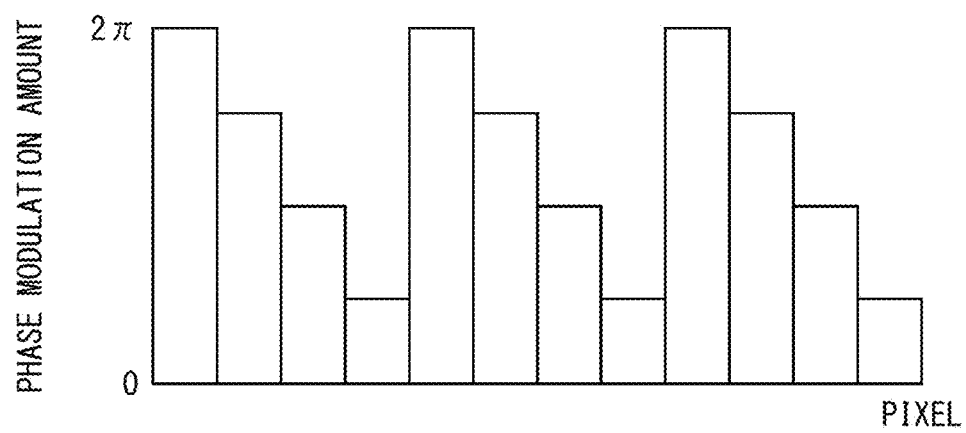

[FIG. 3]
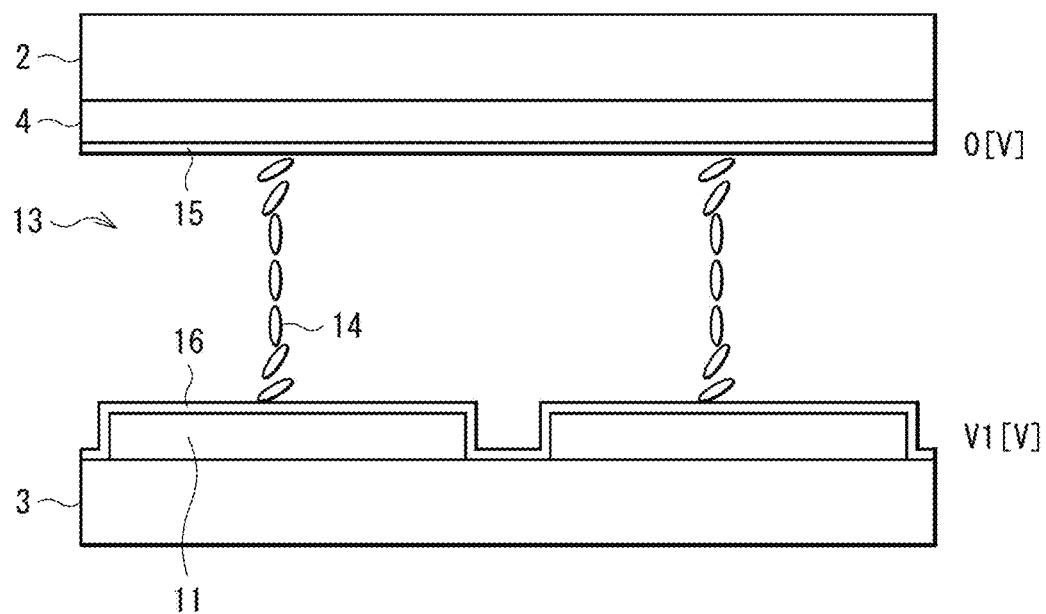

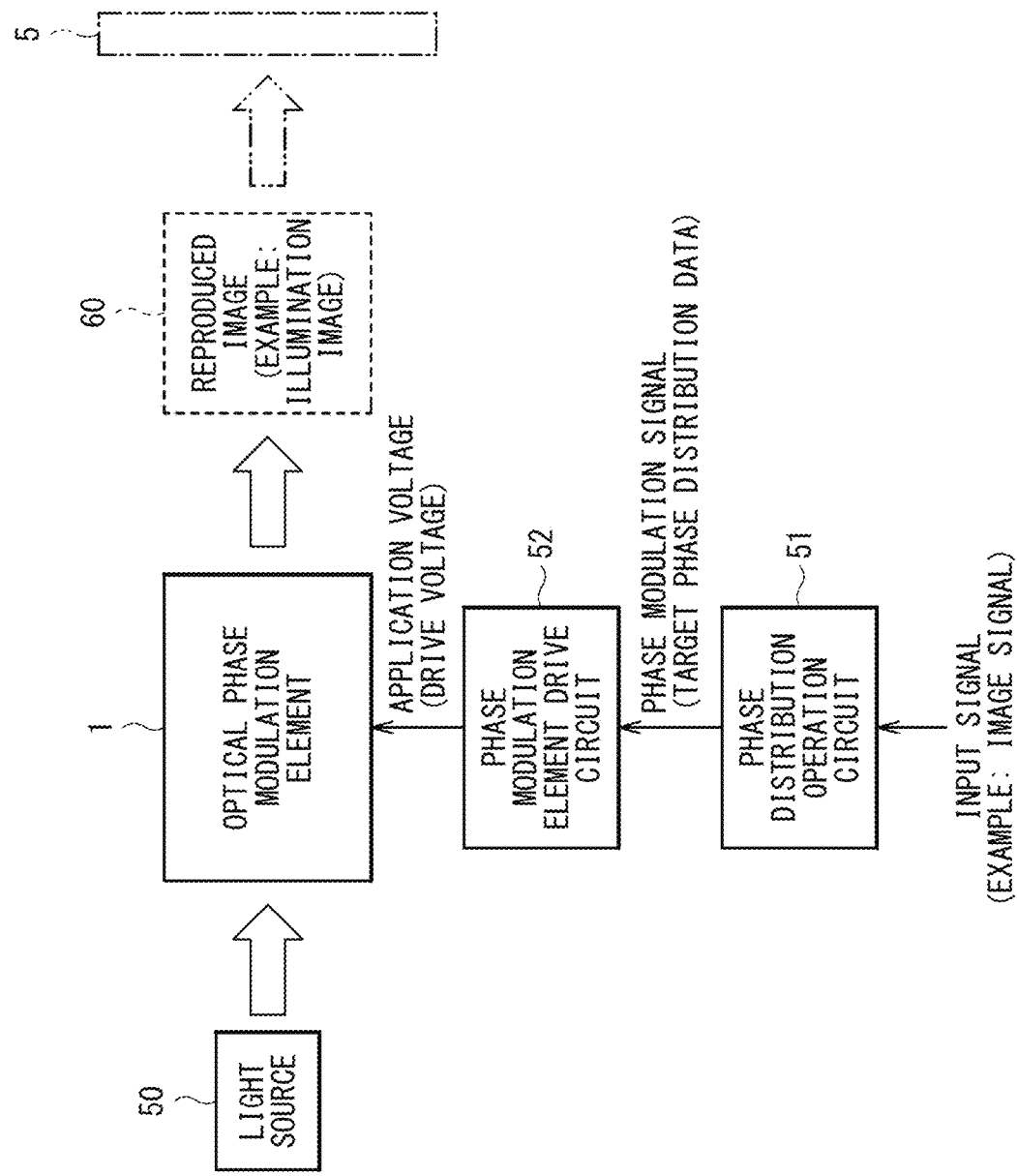
[FIG. 4]

[FIG. 5]
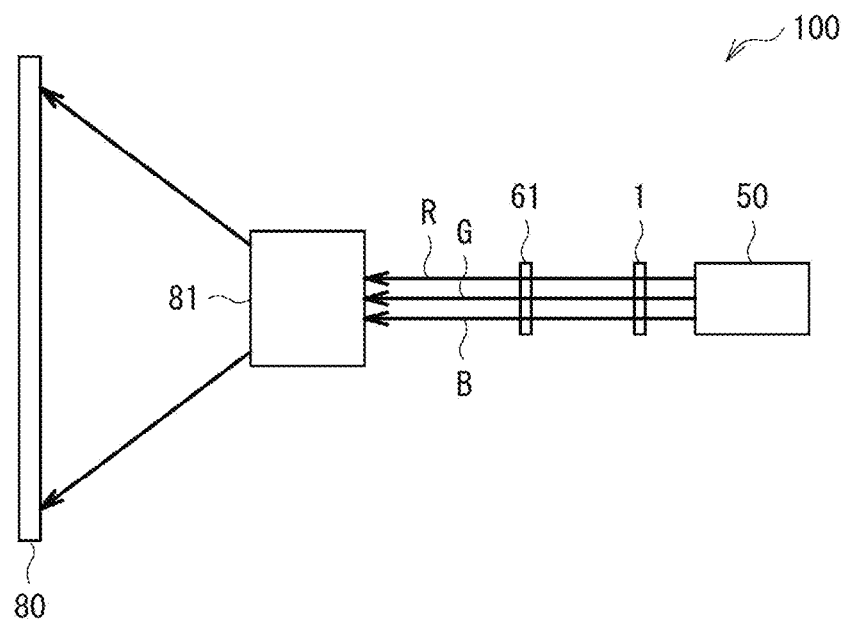
[FIG. 6]
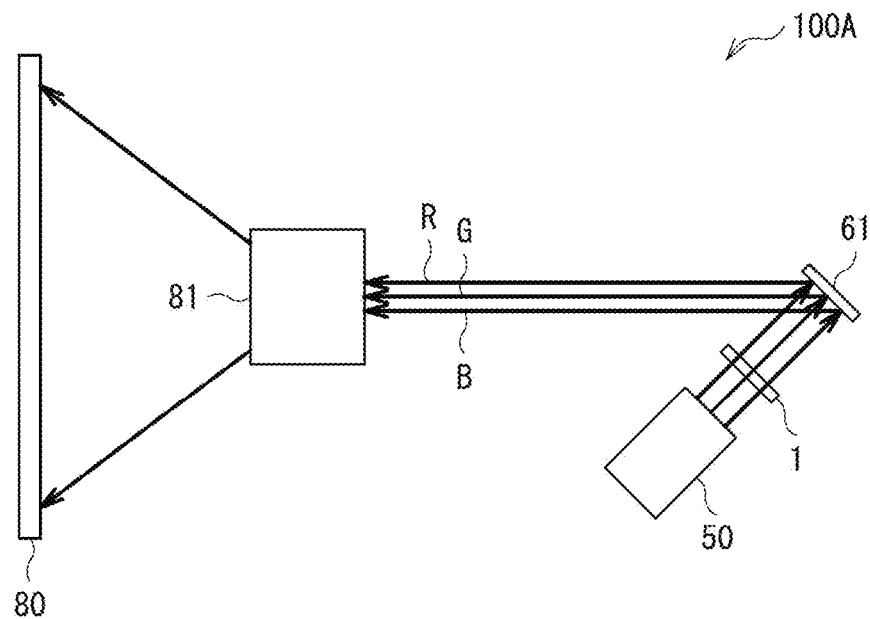

[FIG. 7]
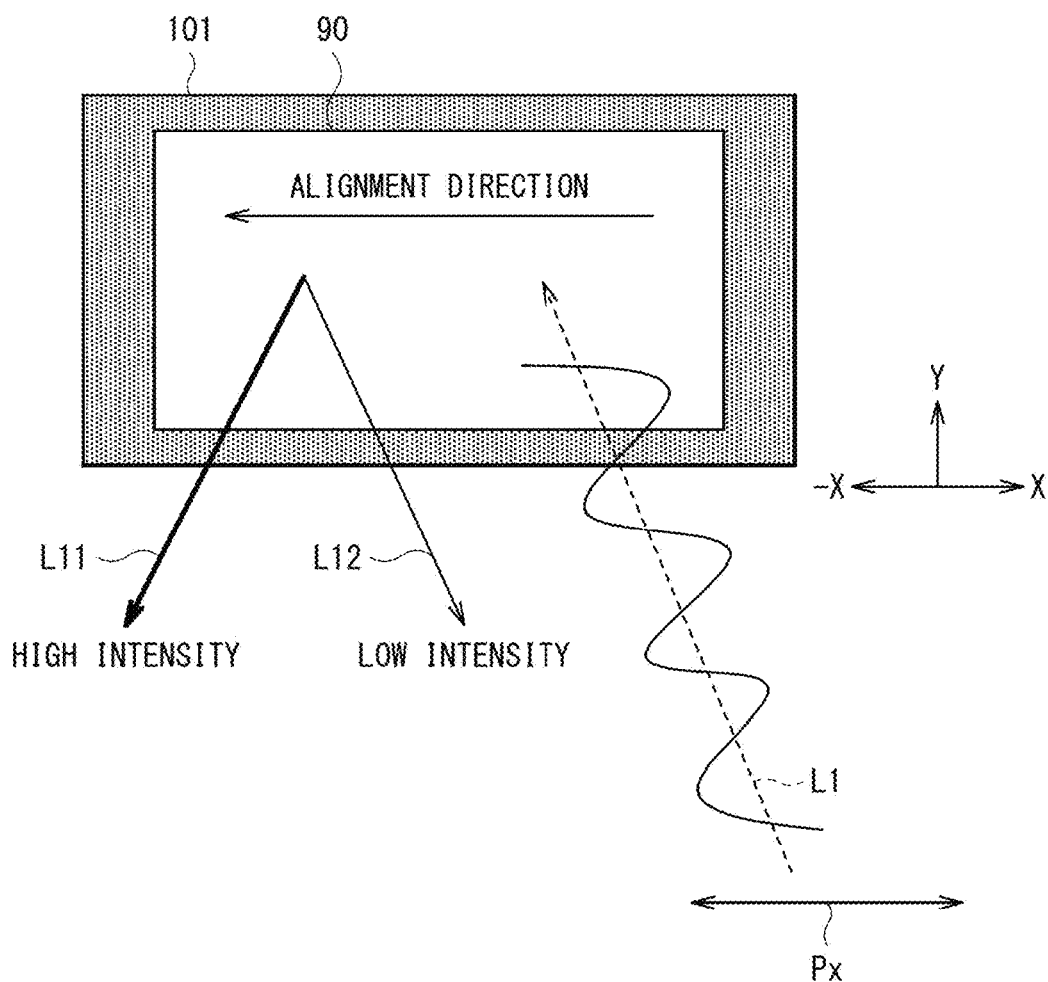

[FIG. 8]
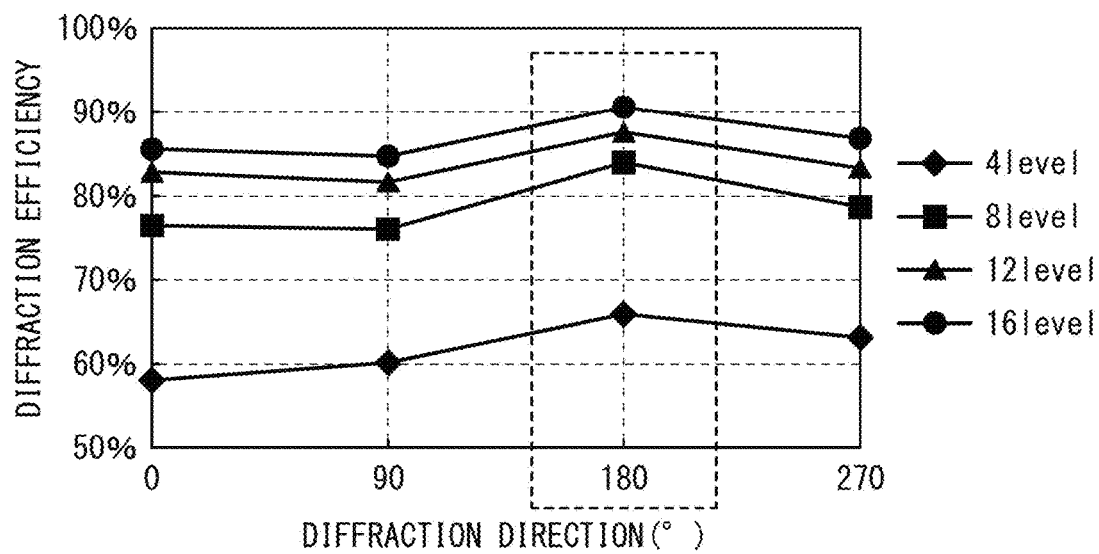
[FIG. 9]
EXAMPLE OF REPRODUCED IMAGE
IDEAL STATE
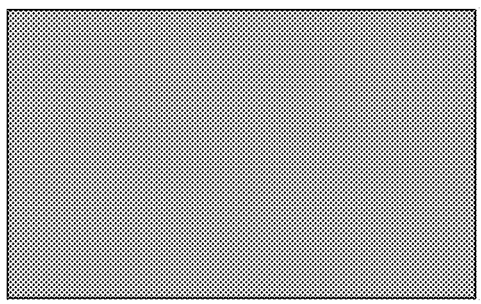
STATE WHERE DIFFRACTION EFFICIENCY IS HIGH ONLY IN 180° DIRECTION
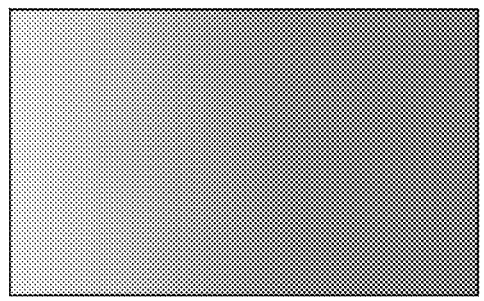

[FIG. 10]
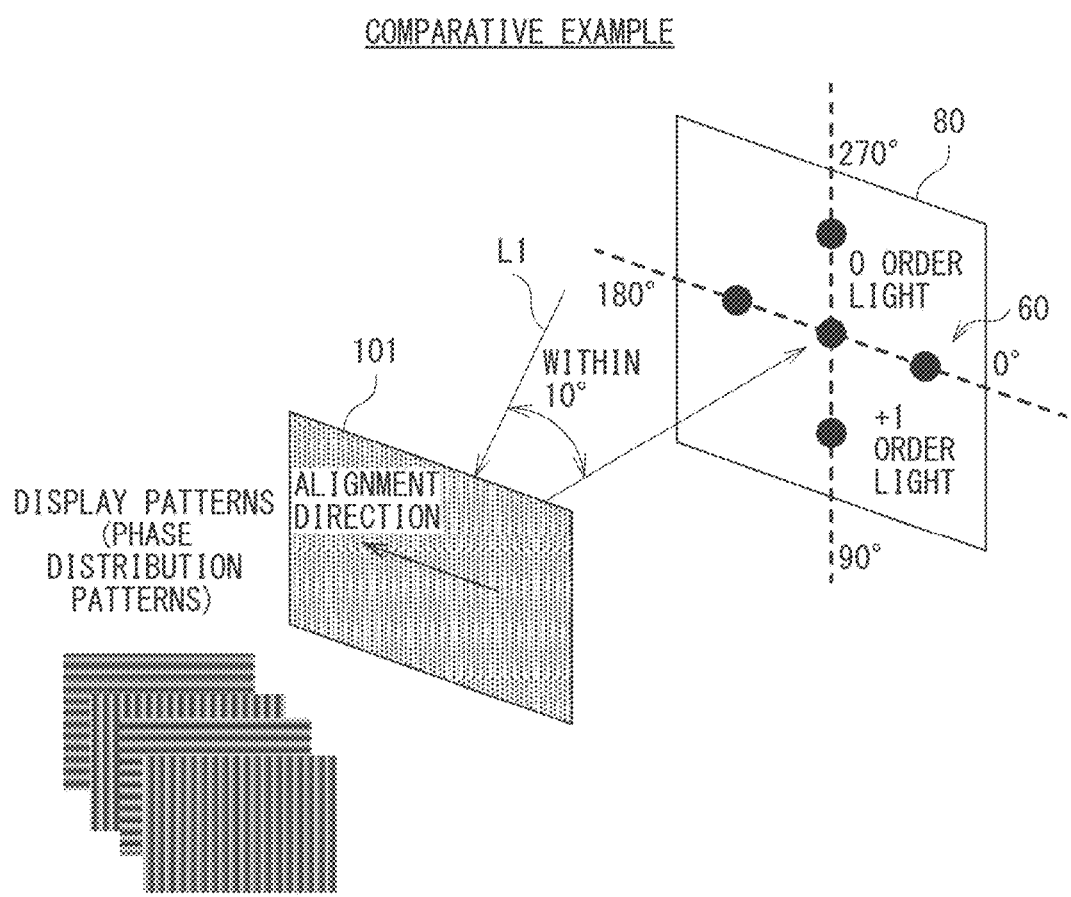
[FIG. 11]
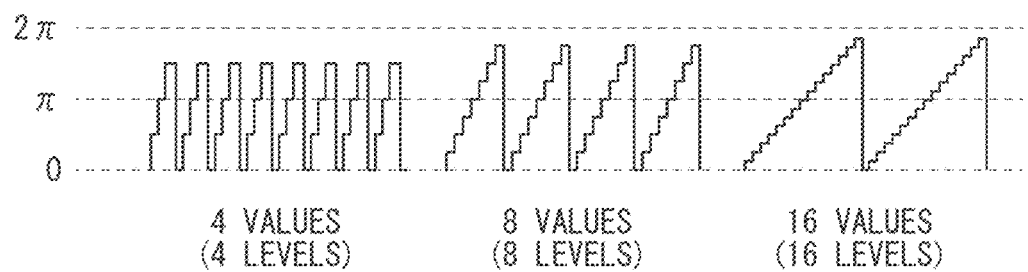

[FIG. 12]
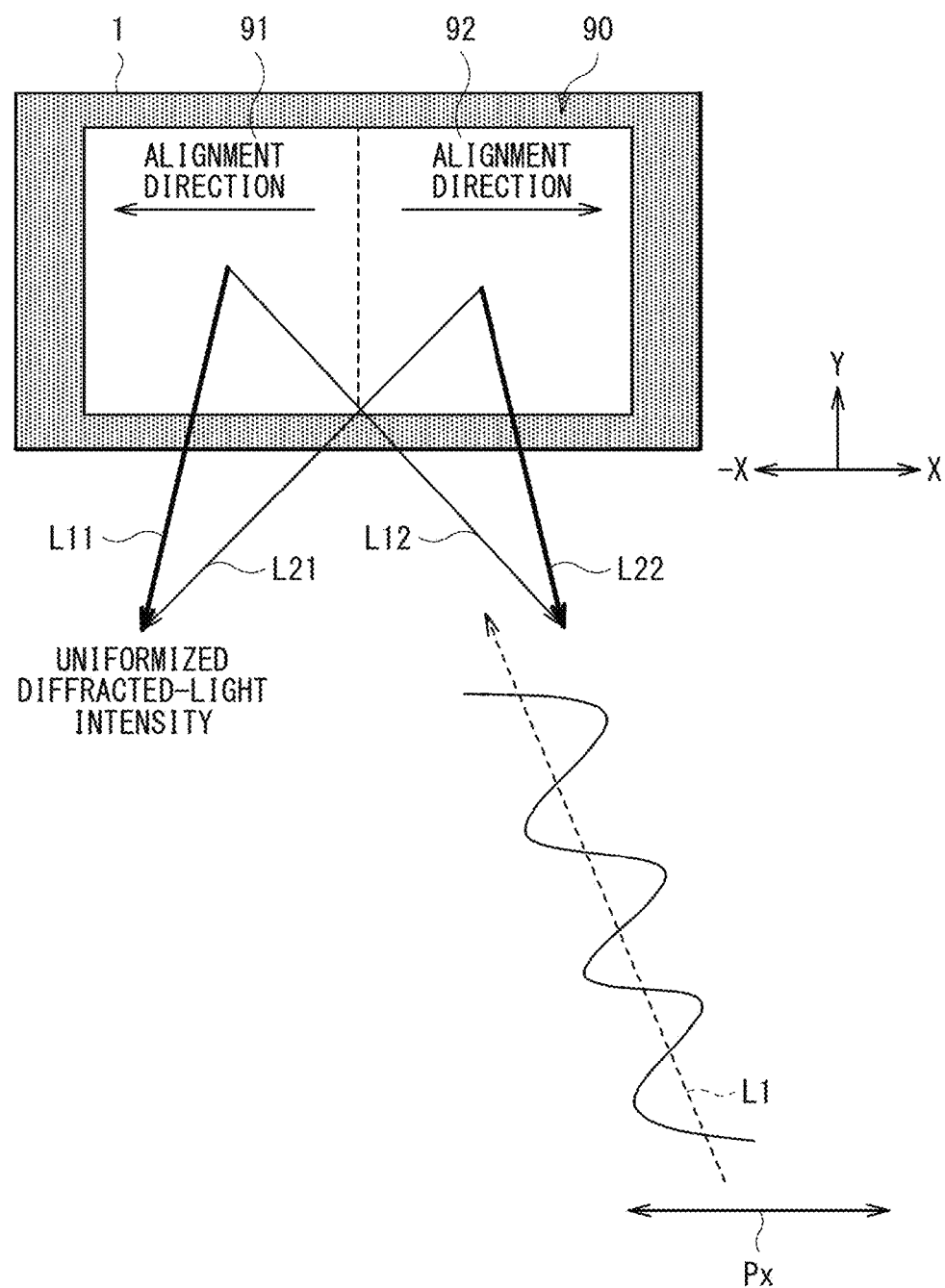

[FIG. 13]
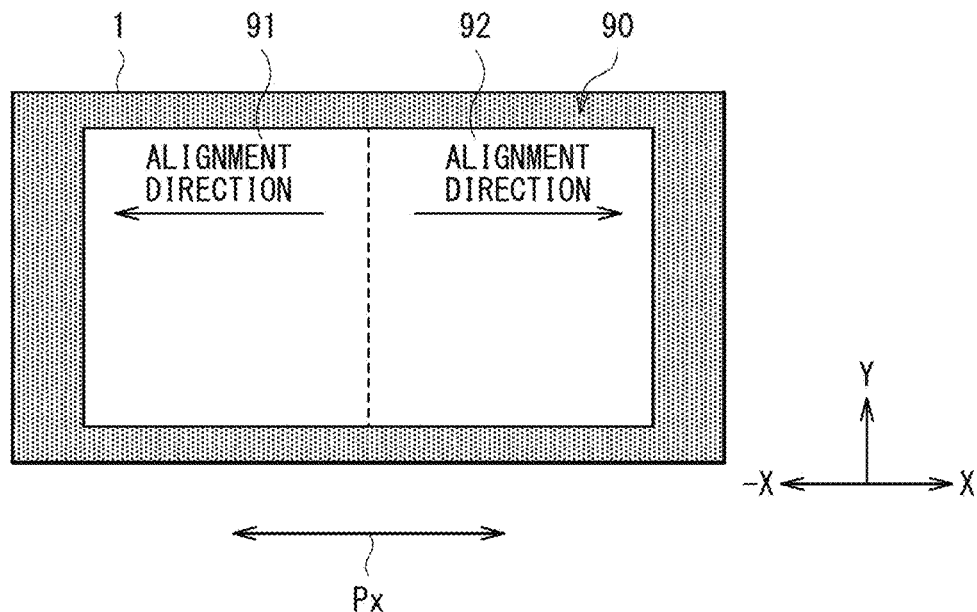
[FIG. 14]
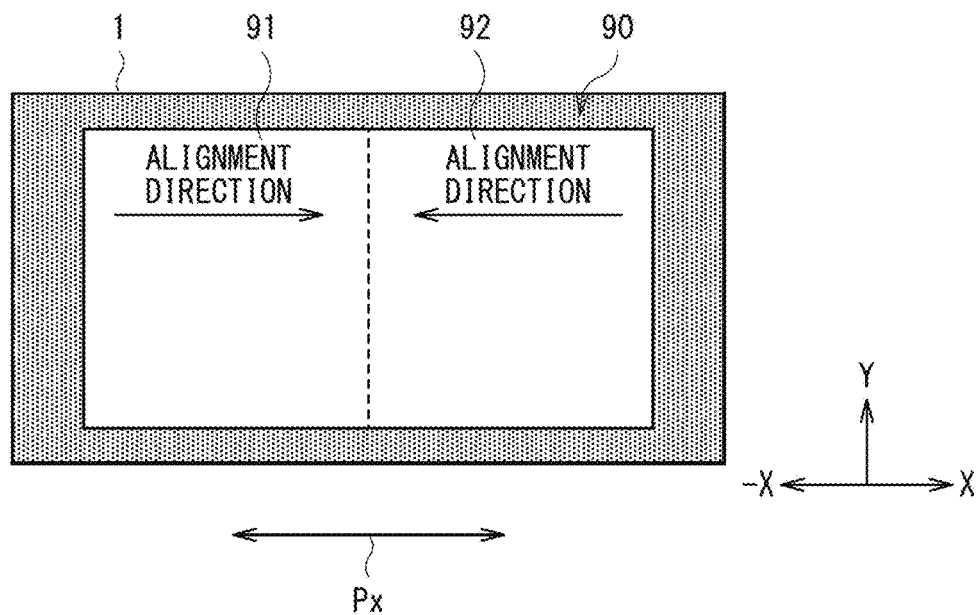

[FIG. 15]
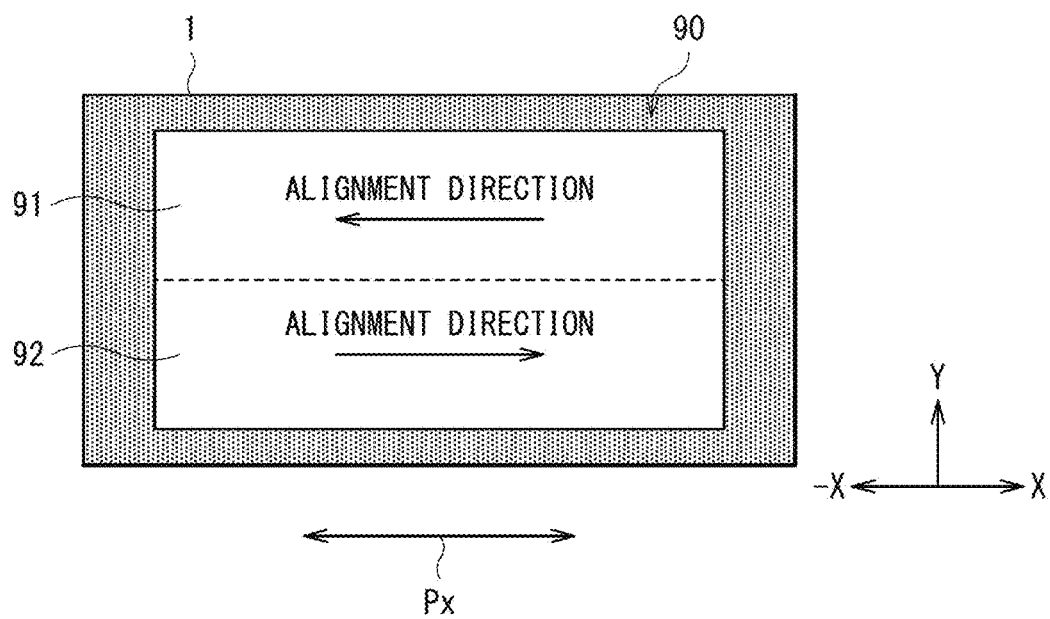
[FIG. 16]
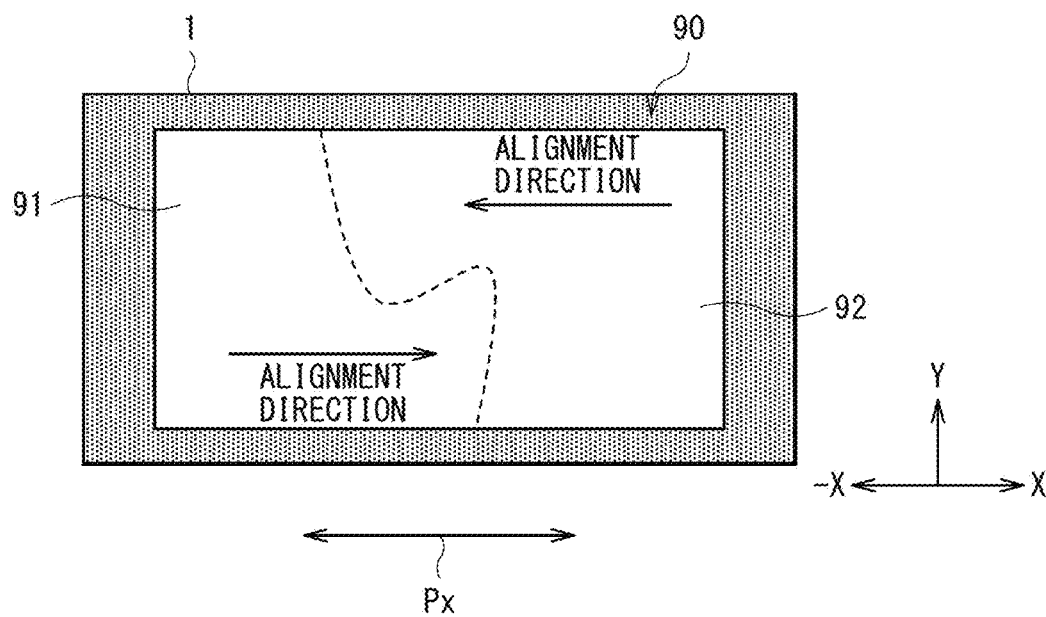

[FIG. 17]
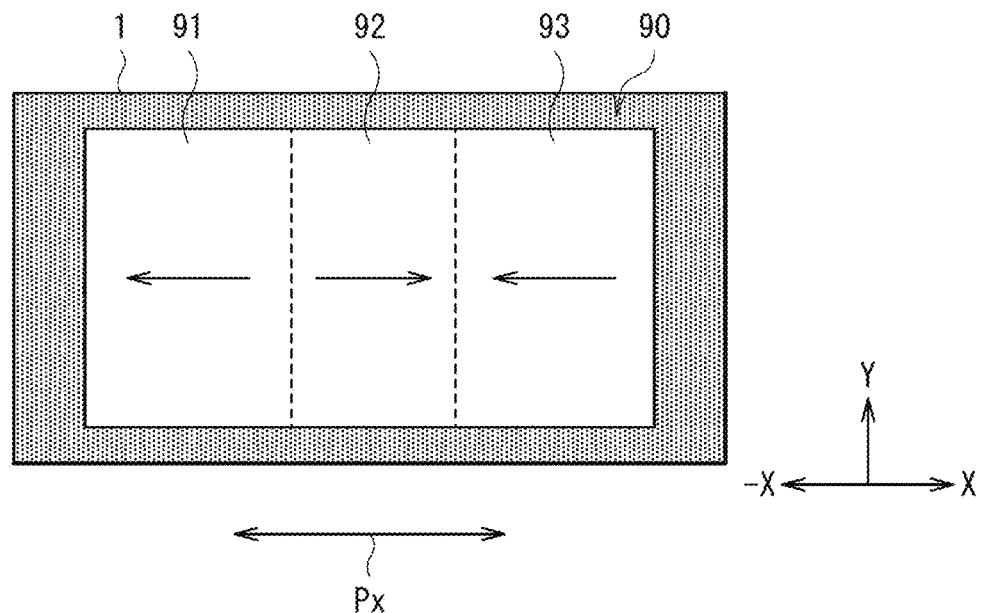
[FIG. 18]
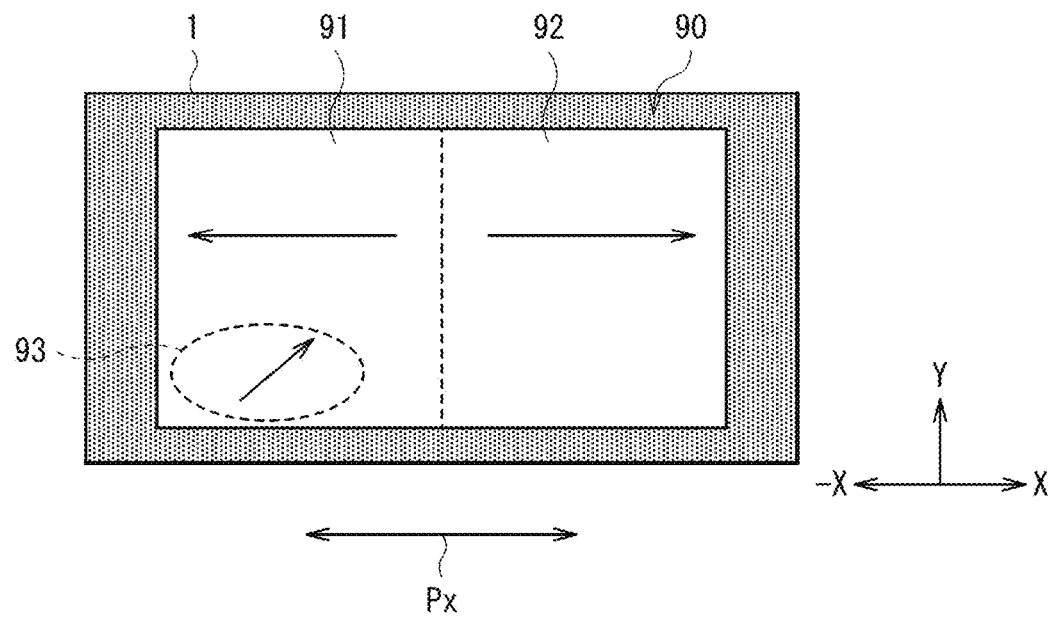

[FIG. 19]
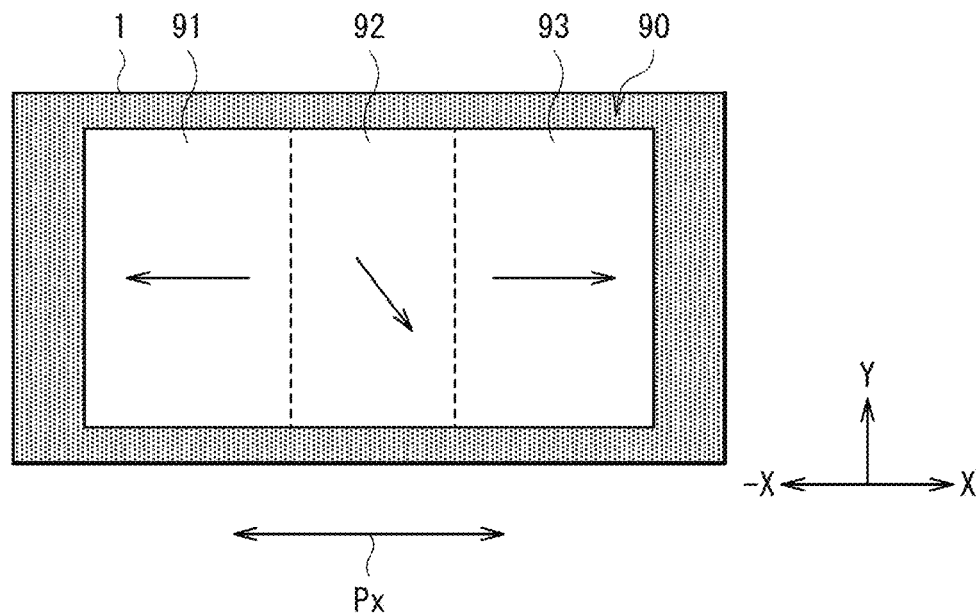
[FIG. 20]
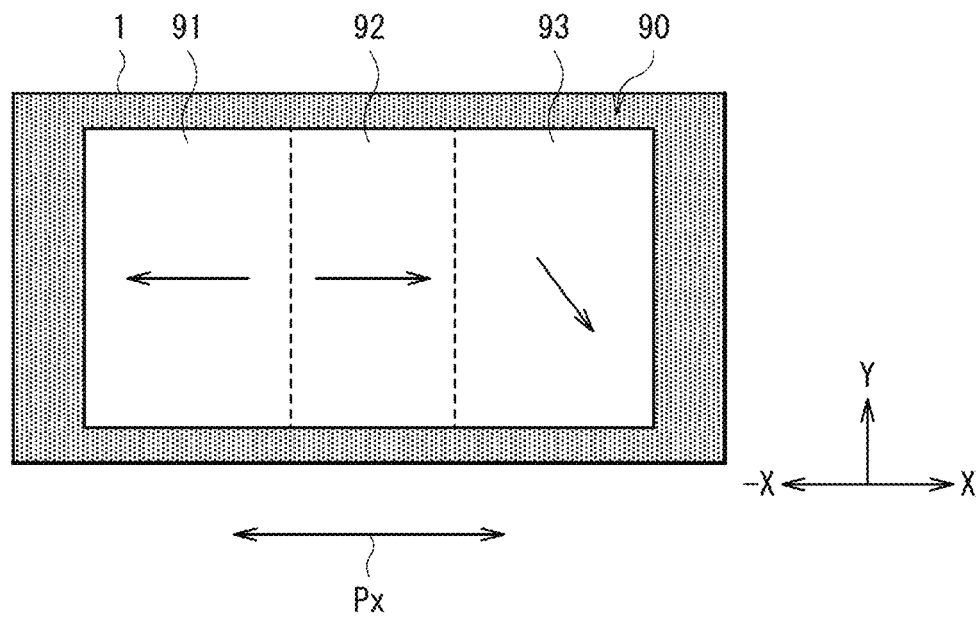

[FIG. 21]
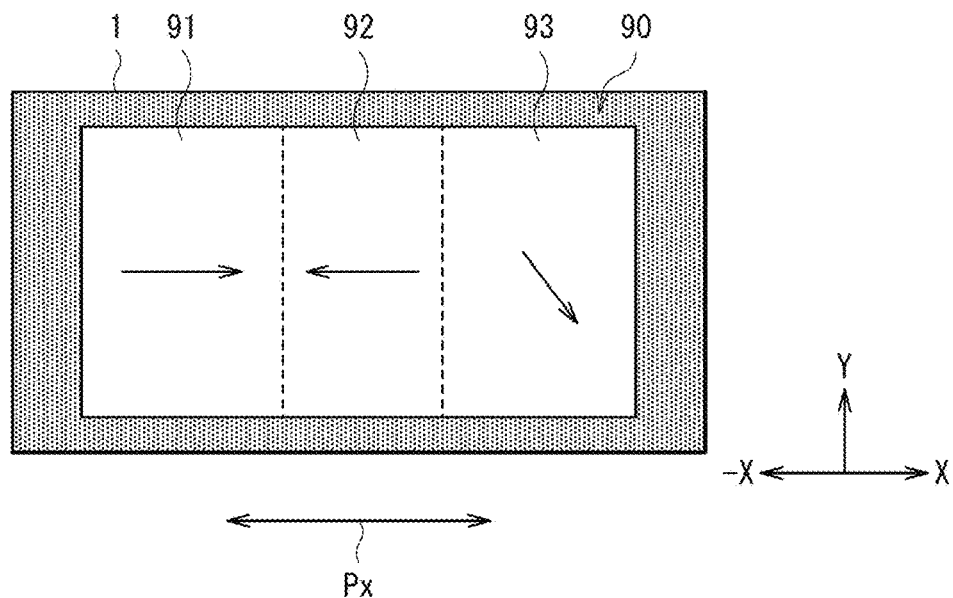
[FIG. 22]
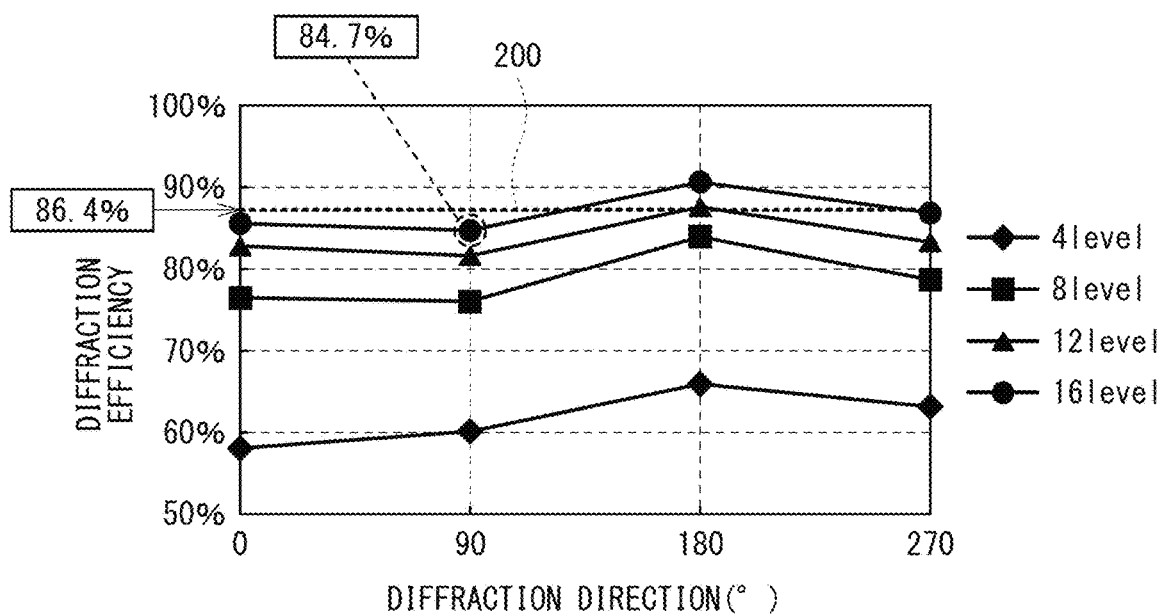

[FIG. 23]
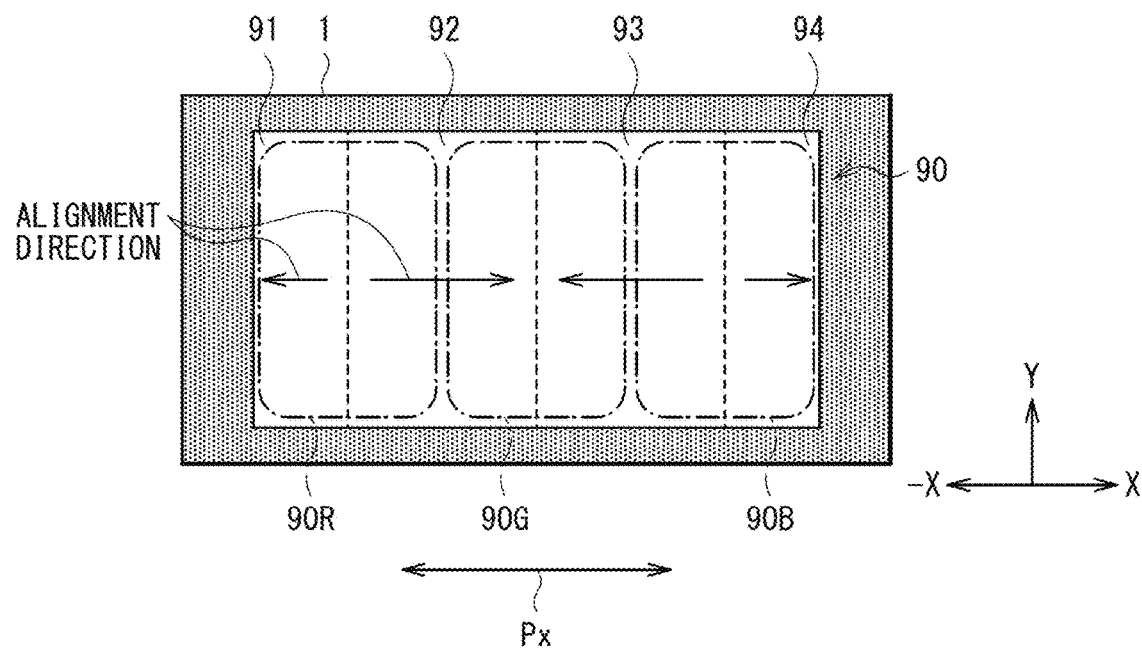

[FIG. 24]
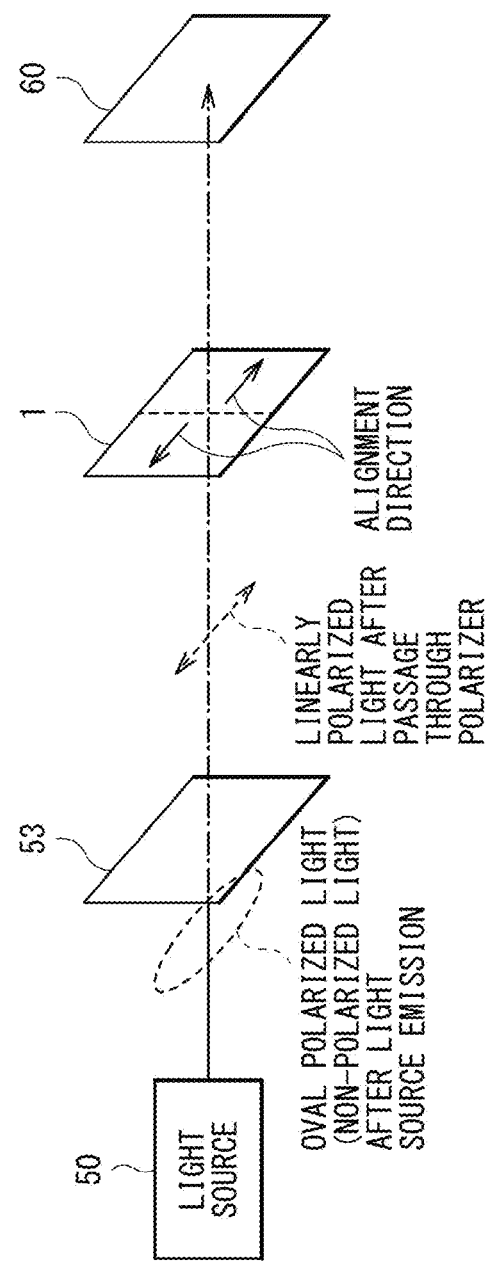

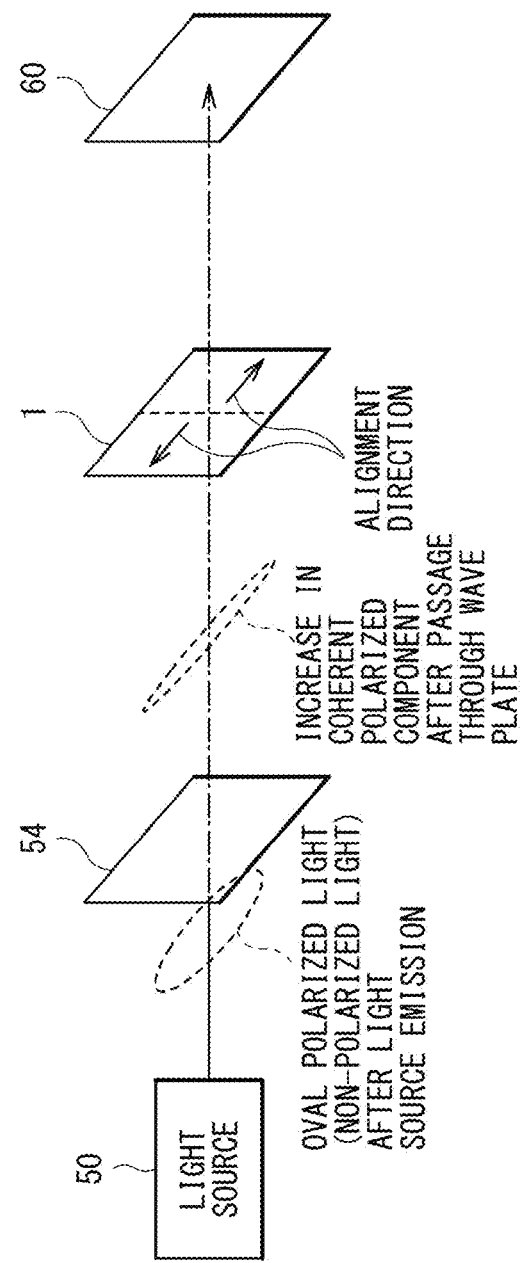
[FIG. 25]

PHASE MODULATION DEVICE AND DISPLAY APPARATUS

CROSS REFERENCE TO RELATED APPLICATIONS

This application is a U.S. National Phase of International Patent Application No. PCT/JP2019/016264 filed on Apr. 16, 2019, which claims priority benefit of Japanese Patent Application No. JP 2018-093717 filed in the Japan Patent Office on May 15, 2018. Each of the above-referenced applications is hereby incorporated herein by reference in its entirety.

TECHNICAL FIELD

The present disclosure relates to a phase modulation device and a display apparatus each including an optical phase modulation element.

BACKGROUND ART

An optical phase modulation element that obtains a desirable reproduced image by modulating a phase of light is known. The optical phase modulation element includes, for example, a SLM (Spatial Light Modulator) such as a liquid crystal panel. As an application of such an optical phase modulation element, there is a technology that generates a reproduced image that is phase-modulated depending on an image by using the optical phase modulation element for an illumination unit in a projector, and utilizes the reproduced image as illumination light for an optical intensity modulation element for image display. Further, the optical phase modulation element is also used for a holography technology, etc. Furthermore, the optical phase modulation element is also used for technologies such as an optical switch and an optical computer.

CITATION LIST

Patent Literature

PTL 1: Japanese Unexamined Patent Application Publication No. S61-51124
PTL 2: Japanese Unexamined Patent Application Publication No. S61-51125

Non-Patent Literature

NPL 1: Gilles Cheriaux, Chris J. Hooker, Michal Stupka, "Wave front generation using a phase-only modulating liquid-crystal-based micro-display with HDTV resolution", Proc. Of SPIE Vol. 6584, 65840E, (2007)

SUMMARY OF THE INVENTION

In an optical phase modulation element including a liquid crystal panel, usually, an alignment direction is one specific direction in a panel plane. In a case where the optical phase modulation element is caused to act as a diffraction element, diffraction efficiency may decrease under influence of a disclination that occurs depending on an alignment direction.

It is desirable to provide a phase modulation device and a display apparatus that make it possible to achieve uniformization of diffraction efficiency.

A phase modulation device according to an embodiment of the present disclosure includes: a light source; and an optical phase modulation element including a plurality of pixels in each of which liquid crystal molecules are arrayed, and including a plurality of pixel regions each including the plurality of pixels, the optical phase modulation element modulating, for each of the pixels, a phase of incident light entering the plurality of pixel regions from the light source, in which the optical phase modulation element includes, as the plurality of pixel regions, at least one first alignment region where an alignment direction of the liquid crystal molecules is a first direction parallel with a polarization axis of the incident light, and at least one second alignment region where an alignment direction of the liquid crystal molecules is a second direction parallel with the polarization axis of the incident light and different from the first direction by 180 degrees.

A display apparatus according to an embodiment of the present disclosure includes: a light source; and an optical phase modulation element including a plurality of pixels in each of which liquid crystal molecules are arrayed, and including a plurality of pixel regions each including the plurality of pixels, the optical phase modulation element modulating, for each of the pixels, a phase of incident light entering the plurality of pixel regions from the light source, thereby reproducing a reproduced image, in which the optical phase modulation element includes, as the plurality of pixel regions, at least one first alignment region where an alignment direction of the liquid crystal molecules is a first direction parallel with a polarization axis of the incident light, and at least one second alignment region where an alignment direction of the liquid crystal molecules is a second direction parallel with the polarization axis of the incident light and different from the first direction by 180 degrees.

In the phase modulation device or the display apparatus according to an embodiment of the present disclosure, the plurality of pixel regions is included in the optical phase modulation element, and optimization of the alignment direction is achieved for each of the pixel regions.

BRIEF DESCRIPTION OF DRAWINGS

FIG. 1 is a plan view schematically illustrating an example of an optical phase modulation element to be applied to a phase modulation device according to a first embodiment of the present disclosure.

FIG. 2 is an explanatory diagram illustrating an example of a relationship between a pixel position and a phase modulation amount of the optical phase modulation element.

FIG. 3 is a cross-sectional view of a configuration example of the optical phase modulation element.

FIG. 4 is a block diagram illustrating a configuration example of the phase modulation device according to the first embodiment.

FIG. 5 is a configuration diagram schematically illustrating a first configuration example of a display apparatus according to the first embodiment.

FIG. 6 is a configuration diagram schematically illustrating a second configuration example of the display apparatus according to the first embodiment.

FIG. 7 is an explanatory diagram illustrating an example of a relationship between a polarization axis of incident light, an alignment direction, and diffracted light beams in an optical phase modulation element according to a comparative example.

FIG. 8 is an explanatory diagram illustrating an example of a relationship between a diffraction direction and diffraction efficiency of the optical phase modulation element according to the comparative example.

FIG. 9 is an explanatory diagram illustrating an example of a reproduced image reproduced by the optical phase modulation element according to the comparative example.

FIG. 10 is an explanatory diagram illustrating an example of a display pattern and a diffraction direction of the optical phase modulation element according to the comparative example.

FIG. 11 is an explanatory diagram illustrating levels of blazed diffraction gratings.

FIG. 12 is an explanatory diagram illustrating an example of a relationship between a polarization axis of incident light, alignment directions, and diffracted light beams in the optical phase modulation element according to the first embodiment.

FIG. 13 is an explanatory diagram illustrating a first example of a variation of a plurality of pixel regions and optimized alignment directions in the optical phase modulation element according to the first embodiment.

FIG. 14 is an explanatory diagram illustrating a second example of a variation of a plurality of pixel regions and optimized alignment directions in the optical phase modulation element according to the first embodiment.

FIG. 15 is an explanatory diagram illustrating a third example of a variation of a plurality of pixel regions and optimized alignment directions in the optical phase modulation element according to the first embodiment.

FIG. 16 is an explanatory diagram illustrating a fourth example of a variation of a plurality of pixel regions and optimized alignment directions in the optical phase modulation element according to the first embodiment.

FIG. 17 is an explanatory diagram illustrating a fifth example of a variation of a plurality of pixel regions and optimized alignment directions in the optical phase modulation element according to the first embodiment.

FIG. 18 is an explanatory diagram illustrating a sixth example of a variation of a plurality of pixel regions and optimized alignment directions in the optical phase modulation element according to the first embodiment.

FIG. 19 is an explanatory diagram illustrating a seventh example of a variation of a plurality of pixel regions and optimized alignment directions in the optical phase modulation element according to the first embodiment.

FIG. 20 is an explanatory diagram illustrating an eighth example of a variation of a plurality of pixel regions and optimized alignment directions in the optical phase modulation element according to the first embodiment.

FIG. 21 is an explanatory diagram illustrating a ninth example of a variation of a plurality of pixel regions and optimized alignment directions in the optical phase modulation element according to the first embodiment.

FIG. 22 is an explanatory diagram illustrating a comparison in terms of a relationship between a diffraction direction and diffraction efficiency between the optical phase modulation element according to the comparative example and the optical phase modulation element according to the first embodiment.

FIG. 23 is an explanatory diagram illustrating an example of a relationship between a polarization axis of incident light and alignment directions in an optical phase modulation element according to a second embodiment.

FIG. 24 is a configuration diagram illustrating a first configuration example of a phase modulation device according to a third embodiment.

FIG. 25 is a configuration diagram illustrating a second configuration example of the phase modulation device according to the third embodiment.

MODES FOR CARRYING OUT THE INVENTION

Some embodiments of the present disclosure are described below in detail with reference to the drawings. It is to be noted that the description is given in the following order.

1. First Embodiment (FIG. 1 to FIG. 22)
1.0 Comparative Example
1.1 Configuration and Operation of Phase Modulation Device and Display Apparatus According to First Embodiment
1.2 Optimization of Alignment Directions in Optical Phase Modulation Element
1.3 Effects
2. Second Embodiment (FIG. 23)
3. Third Embodiment (FIG. 24 to FIG. 25)
4. Other Embodiments 1. First Embodiment 1.0 Comparative Example In an optical phase modulation element, generation of an image by phase modulation is enabled by displaying a hologram pattern. For the optical phase modulation element, a liquid crystal panel called a microdisplay and having a pixel pitch of several microns to tens of microns is used in many cases. At this time, in a case where different voltages are applied to adjacent pixels, an alignment abnormality called a disclination occurs under influence of a transverse electric field generated between the pixels. If the alignment abnormality occurs, a phase modulation amount deviates from an originally desired state, thereby causing a reduction in diffraction efficiency and in turn deterioration of a reproduced image. Further, a state of the alignment abnormality depends on an alignment direction of a liquid crystal material, and thus, usually, in a case where phase modulation is performed in a SLM having an alignment direction of alinement in a specific direction, diffraction efficiency varies depending on a diffraction direction, and a reproduced image may deteriorate. In NPL 1 (Gilles Cheriaux, Chris J. Hooker, Michal Stupka, "Wave front generation using a phase-only modulating liquid-crystal-based micro-display with HDTV resolution", Proc. Of SPIE Vol. 6584, 65840E, (2007)), a diffraction direction and diffraction efficiency when two different voltages are alternately applied for each of pixel lines are inspected, and a disturbance in a wave front occurs due to a disclination occurring between the pixels, thereby causing a difference in diffraction efficiency.

For this reason, in the present disclosure, there is described a technology that averages influence of a disclination by having two or more alignment directions in a pixel region within an optical phase modulation element, and performs uniformization of diffraction efficiency and suppression of deterioration in a reproduced image.

It is to be noted that PTL 1 and PTL 2 (Japanese Unexamined Patent Application Publication No. S61-51124, and Japanese Unexamined Patent Application Publication No. S61-51125) each disclose a technology of varying an alignment direction for each of pixels called a display pattern, as a technology of viewing-angle improvement in an optical intensity modulation element. However, in a case where an alignment direction is varied for each of pixels, a disclination occurs on a border portion between different orientations, even if an attempt is made to control a liquid crystal by applying the same voltage to each of the pixels. In particular, in a microdisplay used for an optical phase modulation element, a pixel pitch is several microns to tens of microns, and thus a large influence of a disclination occurring in each of pixels is exerted, making it difficult to obtain a target phase modulation amount in each of the pixels. Further, in the technology discussed in PTL 1, a polarizing plate is necessary for each of a top and a bottom of a substrate in order to perform optical intensity modulation, but in optical phase modulation, such an optical element on a light extraction side is not necessary.

1.1 Configuration and Operation of Phase Modulation Device and Display Apparatus According to First Embodiment (Outline of Phase Modulation Device)

FIG. 1 schematically illustrates an example of an optical phase modulation element 1 to be applied to a phase modulation device according to a first embodiment of the present disclosure. FIG. 2 illustrates an example of a relationship between a pixel position and a phase modulation amount of the optical phase modulation element 1. FIG. 3 illustrates a configuration example of a cross section of the optical phase modulation element 1.

The optical phase modulation element 1 includes a plurality of pixels 10 arranged in a matrix. A pixel region 90 is formed by the plurality of pixels 10. The pixel region 90 is an irradiation region to be irradiated with light from a light source. Modulating a phase of the light from the light source for each of the pixels 10 in the optical phase modulation element 1 enables use as a diffraction grating. For example, as illustrated in FIG. 2, it is possible to configure a blazed diffraction grating. In FIG. 2, a horizontal axis indicates a pixel position, and a vertical axis indicates a phase modulation amount. A modulation amount of a phase is, for example, in a range of 0 to 2 $\pi$.

The optical phase modulation element 1 includes, for example, a phase modulation liquid crystal panel. The optical phase modulation element 1 includes, for example, a first glass substrate 2 and a second glass substrate 3 opposed to each other, as illustrated in FIG. 3. Between the first glass substrate 2 and the second glass substrate 3, a liquid crystal layer 13 including liquid crystal molecules 14 is sealed by an unillustrated sealing member.

On an opposed surface opposed to the second glass substrate 3 in the first glass substrate 2, an alignment film 15 is provided. On an opposed surface opposed to the first glass substrate 2 in the second glass substrate 3, an alignment film 16 is provided. The liquid crystal molecules 14 are arranged in a plurality of arrays between the first glass substrate 2 and the second glass substrate 3 for each of the pixels 10. An alignment direction of the liquid crystal molecules 14 in each of the pixels 10 is defined, for example, by the alignment film 15 and the alignment film 16.

The first glass substrate 2 is provided with a counter electrode (a common electrode) 4. The second glass substrate 3 is provided with a plurality of pixel electrodes 11. FIG. 3 illustrates only two adjacent pixel electrodes, as an example of the plurality of pixel electrodes 11.

A common voltage (e.g., 0 [V]) common to the plurality of pixel electrodes 11 is applied to the counter electrode 4. An application voltage (e.g., V1 [V]) depending on an input signal is applied to the plurality of pixel electrodes 11. A phase modulation amount of each of the pixels 10 in the optical phase modulation element 1 changes depending on the application voltage.

The optical phase modulation element 1 may be a reflection-type phase modulation liquid crystal panel, and may be a transmission-type phase modulation liquid crystal panel. In the case of the reflection-type phase modulation liquid crystal panel, the counter electrode 4 includes a transparent electrode that allows light to pass therethrough, and the pixel electrode 11 includes a reflecting electrode that reflects light. In the case of the transmission-type phase modulation liquid crystal panel, the counter electrode 4 and the pixel electrode 11 each include a transparent electrode that allows light to pass therethrough.

Such an optical phase modulation element 1 is utilized, for example, as a portion of an illumination unit that generates illumination light for an optical intensity modulation element in a projector. Further, the optical phase modulation element 1 is also used for a holography technology, etc. Furthermore, the optical phase modulation element 1 is used for technologies such as an optical switch and an optical computer.

FIG. 4 illustrates a circuit configuration example of a phase modulation device according to the first embodiment.

The phase modulation device includes the optical phase modulation element 1 that modulates a phase of light from a light source 50, a phase distribution operation circuit 51, and a phase modulation element drive circuit 52.

The phase distribution operation circuit 51 is a phase distribution operation section that generates target phase distribution data (a phase modulation signal) on the basis of an input signal. The target phase distribution data is data having a phase distribution that enables reproduction of a reproduced image 60 (a target reproduced image) by the optical phase modulation element 1.

Here, for example, in a case where the optical phase modulation element 1 is utilized as a portion of an illumination unit in a projector, an input signal is, for example, an image signal. In this case, the reproduced image 60 is an illumination image that illuminates an illumination object 5. The illumination object 5 is, for example, an optical intensity modulation element of an intensity modulation liquid crystal panel or the like in the projector. In this case, the target phase distribution data is data having a phase distribution pattern that enables formation of an illumination image having a luminance distribution depending on an image to be displayed in the projector.

A diffraction element drive circuit 52 generates an application voltage (a drive voltage) based on the target phase distribution data generated in the phase distribution operation circuit 51, and drives the optical phase modulation element 1 to make each of the pixels 10 achieve the target phase distribution.

The optical phase modulation element 1 modulates the phase of the light from the light source 50 on the basis of the application voltage applied by the diffraction element drive circuit 52.

FIG. 4 illustrates the circuit configuration example of the phase modulation device according to the first embodiment.

The phase modulation device includes the optical phase modulation element 1 that modulates the phase of light from the light source 50, the phase distribution operation circuit 51, and the phase modulation element drive circuit 52.

The phase distribution operation circuit 51 is the phase distribution operation section that generates the target phase distribution data (the phase modulation signal) on the basis of the input signal. The target phase distribution data is the data having the phase distribution that enables reproduction of the reproduced image 60 (the target reproduced image) by the optical phase modulation element 1.

Here, for example, in the case where the optical phase modulation element 1 is utilized as the portion of the illumination unit in the projector, the input signal is, for example, the image signal. In this case, the reproduced image 60 is the illumination image that illuminates the illumination object 5. The illumination object 5 is, for example, the optical intensity modulation element of the intensity modulation liquid crystal panel or the like in the projector. In this case, the target phase distribution data is the data having the phase distribution pattern that enables formation of the illumination image having the luminance distribution depending on the image to be displayed in the projector.

The diffraction element drive circuit 52 generates the application voltage (the drive voltage) based on the target phase distribution data generated in the phase distribution operation circuit 51, and drives the optical phase modulation element 1 to make each of the pixels 10 achieve the target phase distribution.

The optical phase modulation element 1 modulates the phase of the light from the light source 50 on the basis of the application voltage applied by the diffraction element drive circuit 52.

In a case where phase modulation of a plurality of light beams having wavelengths different from each other is performed in a field sequential method (a time-divisional method) in the phase modulation device in FIG. 4, a plurality of light beams having wavelengths different from each other is time-divisionally emitted from the light source 50. The optical phase modulation element 1 time-divisionally modulates phases of the plurality of light beams from the light source 50 for each of the wavelengths, and time-divisionally reproduces the plurality of reproduced images 60 for each of the wavelengths. The phase distribution operation circuit 51 generates a plurality of pieces of phase distribution data (target phase distribution data) for each of the wavelengths corresponding to the plurality of reproduced images 60 for each of the wavelengths to be reproduced by the optical phase modulation element 1. The phase modulation element drive circuit 52 generates a plurality of application voltages for each of the wavelengths to be applied to the optical phase modulation element 1, on the basis of the plurality of pieces of phase distribution data for each of the wavelengths, and causes the optical phase modulation element 1 to time-divisionally modulate the phases of the plurality of light beams for each of the wavelengths.

Examples of Application to Display Apparatus

FIG. 5 and FIG. 6 illustrate a first configuration example and a second configuration example of a projector serving as the display apparatus according to the first embodiment including the phase modulation device in FIG. 4. FIG. 5 and FIG. 6 each illustrate a configuration example of a projector that performs full color display by the field sequential method.

A projector 100 illustrated in FIG. 5 and a projector 100A illustrated in FIG. 6 each include the light source 50, the optical phase modulation element 1, an optical intensity modulation element 61, and a projection lens (a projection optical system) 81.

It is to be noted that FIG. 5 and FIG. 6 each illustrate a configuration example including a transmission-type phase modulation element as the optical phase modulation element 1, but a configuration using a reflection-type phase modulation element may be acceptable.

The projector 100 illustrated in FIG. 5 represents an example in which, for example, a transmission-type optical intensity modulation element, e.g., a transmission-type intensity modulation liquid crystal display panel, is configured as the optical intensity modulation element 61. The projector 100A illustrated in FIG. 6 represents an example in which, for example, a reflection-type optical intensity modulation element, e.g., a reflection-type intensity modulation liquid crystal display panel, is configured as the optical intensity modulation element 61.

The light source 50 includes a red light source that emits red color (R) light, a green light source that emits green color (G) light, and a blue light source that emits blue color (B) light. The red light source, the green light source, and the blue light source each include, for example, one or a plurality of laser light sources. The light source 50 time-divisionally emits the red color light, the green color light, and the blue color light.

In the projectors 100 and 100A, the optical phase modulation element 1 is illuminated with the light of each of the colors from the light source 50. At this time, the optical phase modulation element 1 is time-divisionally illuminated with the color of each of the red color light, the green color light, and the blue color light. The optical phase modulation element 1 time-divisionally displays a phase distribution pattern optimized for the wavelength of each of the colors. The phase distribution operation circuit 51 in FIG. 4 generates data (target phase distribution data) of a phase distribution of each of the colors corresponding to the reproduced image 60 of each of the colors reproduced by the optical phase modulation element 1. The phase modulation element drive circuit 52 generates an application voltage of each of the colors to be applied to the optical phase modulation element 1, on the basis of the data of the phase distribution of each of the colors, and causes the optical phase modulation element 1 to time-divisionally modulate the phase of the light of each of the colors.

The optical intensity modulation element 61 is time-divisionally irradiated with the reproduced image 60 of each of the colors formed by the optical phase modulation element 1 for each of the colors, as illumination light. In synchronization with timing at which the light source 50 emits the light of each of the colors, the optical intensity modulation element 61 performs intensity modulation on the illumination light of each of the colors, and time-divisionally generates a projected image of each of the colors.

The projected images of the respective colors of the red color light, the green color light, and the blue color light are outputted toward the projection lens 81. The projection lens 81 time-divisionally projects the projected image of each of the colors onto a projection plane of a screen 80 or the like.

Further, the configuration example of the display apparatus in which the optical phase modulation element 1 and the optical intensity modulation element 61 are combined is described above, but a display apparatus not using the optical intensity modulation element 61 may be employed. There may be employed, for example, a display apparatus that uses the reproduced image 60 itself as a display image, instead of utilizing the reproduced image 60 reproduced by the optical phase modulation element 1 for the illumination light.

Further, the configuration example of the display apparatus that performs the full color display by the field sequential method is illustrated in each of FIG. 5 and FIG. 6, but a configuration in which separate irradiation regions of the one optical phase modulation element 1 are simultaneously irradiated with light beams of the respective colors may be employed. Furthermore, there may be employed a configuration in which the plurality of optical phase modulation elements 1 is provided and the separate optical phase modulation elements 1 are separately irradiated with light beams of the respective colors. For example, a projector of so-called 3LCD may be thereby configured.

1.2 Optimization of Alignment Direction in Optical Phase Modulation Element (Relationship Between Alignment Direction and Diffraction Efficiency in Optical Phase Modulation Element)

FIG. 7 illustrates an example of a relationship between a polarization axis Px of incident light L1, an alignment direction, and diffracted light in an optical phase modulation element 101 according to a comparative example. It is to be noted that an example in which the optical phase modulation element 101 is caused to act as a reflection-type diffraction grating is illustrated in FIG. 7.

In the optical phase modulation element 101 according to the comparative example, an alignment direction is one direction (a −X direction) in the pixel region 90 as a whole. In the optical phase modulation element 101 according to the comparative example, in a case where the incident light L1 in which the polarization axis Px is parallel with an X-axis direction is emitted and diffracted, an influence of a phase shift due to a disclination occurring depending on the alignment direction is exerted, and a difference in diffraction efficiency occurs due to a diffraction direction. For example, in diffracted light L12 diffracted in a direction (an X direction) opposite to the alignment direction, the diffraction efficiency decreases in comparison with diffracted light L11 diffracted in the same direction (the −X direction) as the alignment direction. This makes an optical intensity in the diffracted light L12 diffracted in the direction opposite to the alignment direction relatively low, in comparison with the diffracted light L11 diffracted in the same direction as the alignment direction.

FIG. 8 illustrates an example of a relationship between the diffraction direction and the diffraction efficiency of the optical phase modulation element 101 according to the comparative example illustrated in FIG. 7. FIG. 9 illustrates an example of the reproduced image 60 reproduced by the optical phase modulation element 101 according to the comparative example. FIG. 10 illustrates an example of a display pattern and the diffraction direction of the optical phase modulation element 101 according to the comparative example. FIG. 11 illustrates an example of levels of blazed diffraction gratings.

Characteristics of the diffraction efficiency in FIG. 8 are determined on conditions illustrated in FIG. 10 and FIG. 11. As illustrated in FIG. 10, display patterns (phase distribution patterns) of blazed diffraction gratings varying in diffraction direction are displayed in the optical phase modulation element 101, and the reproduced image 60 is reproduced on the screen 80. The diffraction directions are a 0-degree direction, a 90-degree direction, a 180-degree direction, and a 270-degree direction on a screen plane. A diffraction angle of the optical phase modulation element 101 varies depending on levels of the blazed diffraction grating to be displayed. Examples of the blazed diffraction gratings of 4 values (4 levels), 8 values (8 levels), and 16 values (16 levels) are illustrated in FIG. 11.

As illustrated in FIG. 8, in the optical phase modulation element 101 according to the comparative example, the difference in diffraction efficiency occurs due to the diffraction direction. In the comparative example in FIG. 8, the diffraction efficiency is high only in a case where the diffraction direction is 180 degrees, and the diffraction efficiency in other diffraction directions is low. For this reason, for example, as illustrated in FIG. 9, uniformity of the reproduced image 60 reproduced by the optical phase modulation element 101 deteriorates. It is to be noted that, in FIG. 9, a case where an ideal state of the reproduced image 60 is a luminance distribution that is uniform in a plane is illustrated as an example.

Specific Example of Optimized Alignment Direction

In contrast to the optical phase modulation element 101 according to the comparative example described above, the plurality of pixel regions is formed by the plurality of pixels 10, and the alignment direction of each of the pixel regions is optimized in the optical phase modulation element 1 according to the first embodiment. The optical phase modulation element 1 modulates a phase of the incident light L1 entering the plurality of pixel regions for each of the pixels. At least one first alignment region and at least one second alignment region are included in the plurality of pixel regions. The first alignment region is a region where the alignment direction of the liquid crystal molecules 14 is a first direction parallel with the polarization axis Px of the incident light L1. The second alignment region is a region where the alignment direction of the liquid crystal molecules 14 is a second direction parallel with the polarization axis Px of the incident light L1 and different from the first direction by 180 degrees.

Further, the plurality of pixel regions may further include at least one third alignment region where the alignment direction of the liquid crystal molecules 14 is a third direction different from the first direction and the second direction.

A specific example of the plurality of pixel regions and the optimized alignment direction is described below.

FIG. 12 illustrates an example of a relationship between the polarization axis Px of the incident light L1, the alignment directions, and the diffracted light beams in the optical phase modulation element 1 according to the first embodiment. It is to be noted that an example in which the optical phase modulation element 1 is caused to act as a reflection-type diffraction grating is illustrated in FIG. 12.

In the example in FIG. 12, the pixel region 90 of the optical phase modulation element 1 is divided into two arranged in a horizontal direction, and a first pixel region 91 and a second pixel region 92 are formed in the horizontal direction. The above-described first direction is a −X direction, and the above-described second direction is an X direction. The first pixel region 91 is the first alignment region where the alignment direction is the first direction (the −X direction) parallel with the polarization axis Px of the incident light L1. The second pixel region 92 is the second alignment region where the alignment direction is the second direction (the X direction) parallel with the polarization axis Px of the incident light L1 and different from the first direction by 180 degrees.

As illustrated in FIG. 12, within the pixel region 90 of the optical phase modulation element 1, the two directions in which the alignment directions are horizontal (parallel) with respect to the polarization axis Px and which are different from each other by 180 degrees are included, and the diffraction efficiency is thereby uniformized. The reproduced image is also thereby uniformized.

In the example in FIG. 12, in the optical phase modulation element 1, in a case where the incident light L1 in which the polarization axis Px is parallel with the X-axis direction is emitted and diffracted, the first pixel region 91 and the second pixel region 92 have characteristics opposite to each other in terms of a phase shift due to a disclination occurring depending on the alignment direction, and the diffraction efficiency is thereby uniformized. In the first pixel region 91, the diffraction efficiency in the diffracted light L12 diffracted in the X direction decreases in comparison with the diffracted light L11 diffracted in the −X direction. Conversely, in the second pixel region 92, the diffraction efficiency in diffracted light L21 diffracted in the −X direction decreases in comparison with diffracted light L22 diffracted in the X direction. The diffraction efficiency is thereby uniformized in the pixel region 90 as a whole.

FIG. 13 to FIG. 21 illustrate variations of the plurality of pixel regions and the optimized alignment directions in the optical phase modulation element 1.

In order to uniformize the diffraction efficiency, at least alignment regions of two directions which are parallel with the polarization axis Px and different from each other by 180 degrees only have to be included, and thus, variations of a division method of the pixel region 90 and a setting method of the alignment region as illustrated in, for example, FIG. 13 to FIG. 21 are conceivable. It is to be noted that the description is provided below using a case where the polarization axis Px of the incident light L1 is a direction parallel with the X-axis and the above-described first direction is the −X direction whereas the second direction is the X direction as an example. In a case where the polarization axis Px of the incident light L1 is other direction different from the X-axis by an angle θ, the first direction and the second direction described above also only have to be directions parallel with the other direction different from the X-axis by the angle θ.

Here, FIG. 13 to FIG. 16 each illustrate an example in which the pixel region 90 is divided into two regions of the first pixel region 91 and the second pixel region 92 and the respective alignment directions are different. In the case of the division into two, the alignment directions include only two directions parallel with the polarization axis Px of the incident light L1 and different from each other by 180 degrees, and a division point and a division area of the pixel region 90 are arbitrary.

As with the example in FIG. 12, FIG. 13 illustrates an example in which the pixel region 90 of the optical phase modulation element 1 is divided into two arranged in the horizontal direction, and the first pixel region 91 and the second pixel region 92 are formed in the horizontal direction. In the example in FIG. 13, the first pixel region 91 is the first alignment region where the alignment direction is the first direction (the −X direction) parallel with the polarization axis Px of the incident light L1. The second pixel region 92 is the second alignment region where the alignment direction is the second direction (the X direction) parallel with the polarization axis Px of the incident light L1 and different from the first direction by 180 degrees.

FIG. 14 illustrates an example in which the pixel region 90 of the optical phase modulation element 1 is divided into two arranged in the horizontal direction, and the first pixel region 91 and the second pixel region 92 are formed in the horizontal direction. In the example in FIG. 14, the first pixel region 91 is the second alignment region where the alignment direction is the second direction (the X direction) parallel with the polarization axis Px of the incident light L1. The second pixel region 92 is the first alignment region where the alignment direction is the first direction (the −X direction) parallel with the polarization axis Px of the incident light L1 and different from the second direction by 180 degrees.

FIG. 15 illustrates an example in which the pixel region 90 of the optical phase modulation element 1 is divided into two arranged in a vertical direction, and the first pixel region 91 and the second pixel region 92 are formed in the vertical direction. In the example in FIG. 15, the first pixel region 91 is the first alignment region where the alignment direction is the first direction (the −X direction) parallel with the polarization axis Px of the incident light L1. The second pixel region 92 is the second alignment region where the alignment direction is the second direction (the X direction) parallel with the polarization axis Px of the incident light L1 and different from the first direction by 180 degrees.

FIG. 16 is similar to the example in FIG. 14, except that a border between the first pixel region 91 and the second pixel region 92 is a curve instead of being a straight line.

Further, FIG. 17 to FIG. 21 each illustrate an example in which the pixel region 90 is divided into three regions of the first pixel region 91, the second pixel region 92, and a third pixel region 93, and the alignment direction of each of these regions is optimized. It is to be noted that it is also possible to further divide the pixel region 90 into four or more. In the case of the division into three or more, the alignments in two directions that are parallel with the polarization axis Px of the incident light L1 and different from each other by 180 degrees only have to be included in a portion. The alignment directions in other divisional regions are arbitrary. Further, as with the case of the division into two, the division point and the division area of the pixel region 90 are also arbitrary.

FIG. 17 illustrates an example in which the pixel region 90 of the optical phase modulation element 1 is divided into three arranged in the horizontal direction, and the first pixel region 91, the second pixel region 92, and the third pixel region 93 are formed in the horizontal direction. In the example in FIG. 17, the first pixel region 91 is the first alignment region where the alignment direction is the first direction (the −X direction) parallel with the polarization axis Px of the incident light L1. The second pixel region 92 is the second alignment region where the alignment direction is the second direction (the X direction) parallel with the polarization axis Px of the incident light L1 and different from the first direction by 180 degrees. The third pixel region 93 is the first alignment region where the alignment direction is the first direction (the −X direction) parallel with the polarization axis Px of the incident light L1.

FIG. 18 illustrates an example in which the pixel region 90 of the optical phase modulation element 1 is divided into substantially two arranged in the horizontal direction, the first pixel region 91 and the second pixel region 92 are formed in the horizontal direction, and the third pixel region 93 is formed within the first pixel region 91. In the example in FIG. 18, the first pixel region 91 is the first alignment region where the alignment direction is the first direction (the −X direction) parallel with the polarization axis Px of the incident light L1. The second pixel region 92 is the second alignment region where the alignment direction is the second direction (the X direction) parallel with the polarization axis Px of the incident light L1 and different from the first direction by 180 degrees. The third pixel region 93 is the third alignment region where the alignment direction is the third direction different from the first direction and the second direction.

FIG. 19 illustrates an example in which the pixel region 90 of the optical phase modulation element 1 is divided into three arranged in the horizontal direction, and the first pixel region 91, the second pixel region 92, and the third pixel region 93 are formed in the horizontal direction. In the example in FIG. 19, the first pixel region 91 is the first alignment region where the alignment direction is the first direction (the −X direction) parallel with the polarization axis Px of the incident light L1. The second pixel region 92 is the third alignment region where the alignment direction is the third direction different from the first direction and the second direction. The third pixel region 93 is the second alignment region where the alignment direction is the second direction (the X direction) parallel with the polarization axis Px of the incident light L1 and different from the first direction by 180 degrees.

FIG. 20 illustrates an example in which the pixel region 90 of the optical phase modulation element 1 is divided into three arranged in the horizontal direction, and the first pixel region 91, the second pixel region 92, and the third pixel region 93 are formed in the horizontal direction. In the example in FIG. 20, the first pixel region 91 is the first alignment region where the alignment direction is the first direction (the −X direction) parallel with the polarization axis Px of the incident light L1. The second pixel region 92 is the second alignment region where the alignment direction is the second direction (the X direction) parallel with the polarization axis Px of the incident light L1 and different from the first direction by 180 degrees. The third pixel region 93 is the third alignment region where the alignment direction is the third direction different from the first direction and the second direction.

FIG. 21 illustrates an example in which the pixel region 90 of the optical phase modulation element 1 is divided into three arranged in the horizontal direction, and the first pixel region 91, the second pixel region 92, and the third pixel region 93 are formed in the horizontal direction. In the example in FIG. 21, the first pixel region 91 is the second alignment region where the alignment direction is the second direction (the X direction) parallel with the polarization axis Px of the incident light L1 and different from the first direction by 180 degrees. The second pixel region 92 is the first alignment region where the alignment direction is the first direction (the −X direction) parallel with the polarization axis Px of the incident light L1. The third pixel region 93 is the third alignment region where the alignment direction is the third direction different from the first direction and the second direction.

It is to be noted that, desirably, an area of the third alignment region is 2% or less of an area of all the plurality of pixel regions (the entire pixel region 90).

FIG. 22 illustrates a comparison in terms of a relationship between the diffraction direction and the diffraction efficiency of the optical phase modulation element 101 according to the comparative example and the optical phase modulation element 1 according to the first embodiment.

It is to be noted that, in FIG. 22, diffraction characteristics of the optical phase modulation element 101 according to the comparative example are similar to those in FIG. 8. In FIG. 22, a characteristic indicated by a reference numeral 200 indicates a diffraction characteristic of the optical phase modulation element 1 according to the first embodiment.

In FIG. 22, when attention is focused on, for example, the diffraction characteristic of 16 levels, in order to achieve uniformization of the diffraction efficiency in the optical phase modulation element 101 according to the comparative example, it is necessary to design a phase distribution to be displayed in the optical phase modulation element 101 in agreement with the worst value of 84.7% of the diffraction efficiency (the 90-degree direction). In contrast, in the optical phase modulation element 1 according to the first embodiment, because averaged diffraction efficiency is obtained by optimizing the alignment direction as described above, it is predicted that diffraction efficiency of around 86.4% is obtainable irrespective of the direction. From this, in the optical phase modulation element 1 according to the first embodiment, a rise of around 2% in the diffraction efficiency is expected in comparison with the optical phase modulation element 101 according to the comparative example. For this reason, if the third alignment region is a region not contributing to diffraction, it is desirable that the area thereof be substantially 2% or less of the entire pixel region 90.

Specific Example of Control of Alignment Direction

The optical phase modulation element 1 includes an alignment control means (an alignment control section) that controls the alignment direction of the liquid crystal molecules 14 in each of the plurality of pixel regions. The alignment control means may be, for example, a method of using the alignment films 15 and 16 (see FIG. 3). In this case, there is a method of deciding an alignment direction by oblique deposition of SiO, rubbing of polyimide, irradiating a polymer film with light having anisotropy, or the like. Further, as the alignment control means, a method not using the alignment films 15 and 16 may be employed. For example, there is a method of regulating tilt directions of the liquid crystal molecules 14 by providing the liquid crystal layer 13 with a structure in which the tilt directions of the liquid crystal molecules 14 become uniform when a voltage is applied. Furthermore, there is a method such as a method of determining the tilt directions of the liquid crystal molecules 14 by causing an electric field to be generated in an oblique direction in a panel front view using an electrode. It is possible to define the alignment direction using these techniques.

Specific Example of Light Source 50

It is desirable that the light source 50 be a coherent light source. In a case where the coherent light source such as a laser light source is used for the light source 50, it is possible to make light of linearly polarized light enter the optical phase modulation element 1 as the incident light L1, without using a polarization control means such as a polarizing plate. This increases interference of the incident light L1, thereby making it possible to improve the diffraction efficiency. In this case, an extra optical member intended to make the incident light L1 become the linearly polarized light is not necessary, and it is therefore possible to reduce cost of the display apparatus.

(Others)

In the optical phase modulation element 1, it is desirable that the border between the plurality of pixel regions be shielded. In a border between regions varying in alignment direction, a change portion of the alignment control means is formed, and thus a region where alignment in an intended direction is not achievable is formed. In that case, the tilt directions of the liquid crystal molecules 14 are not stable, and this causes a disclination, and deterioration in reproduced image due to noise by the disclination occurs. For this reason, in order to prevent the deterioration by the noise, it is desirable to hide the disclination by shielding a division border.

1.3 Effects

As described above, according to the phase modulation device and the display apparatus according to the first embodiment, because the plurality of pixel regions is formed in the optical phase modulation element 1 and optimization of the alignment direction for each of the pixel regions is achieved, it is possible to achieve uniformization of the diffraction efficiency in the optical phase modulation element 1.

According to the phase modulation device and the display apparatus according to the first embodiment, the uniformization of the diffraction efficiency is achieved with respect to the diffraction direction in the optical phase modulation element 1, and in turn, uniformization of the reproduced image 60 is enabled. This makes it unnecessary to consider correction of nonuniformity of the reproduced image 60 when a phase distribution to be displayed in the optical phase modulation element 1 is calculated, thereby reducing the number of adjustment processes in design and manufacturing.

It is to be noted that the effects described herein are mere examples and non-limiting, and other effects may also be provided. This also holds true for effects of the following other embodiments.

2. Second Embodiment

Next, a phase modulation device and a display apparatus according to a second embodiment of the present disclosure are described. It is to be noted that, in the following, components substantially the same as those of the phase modulation device and the display apparatus according to the above-described first embodiment are denoted by the same reference numerals, and the description thereof is omitted where appropriate.

For example, in the configuration example illustrated in FIG. 4 to FIG. 6, the light source 50 may output a plurality of light beams having wavelengths different from each other. In the optical phase modulation element 1, a plurality of irradiation regions set for the respective wavelengths may be irradiated with the incident light L1. In this case, the plurality of irradiation regions may each be set to include the first alignment region and the second alignment region, as in the above-described first embodiment.

In a case where the light source 50 has two or more different wavelengths, light beams having, for example, RGB components simultaneously enter the optical phase modulation element 1 and the reproduced images 60 in the respective wavelengths are combined on a reproduced image, and full color display is thereby enabled. At this time, the light beams having the RGB components enter different points of the optical phase modulation element 1, and thus uniformization of the reproduced image 60 is enabled by having alignment directions of two directions that are parallel with the polarization axis Px of the incident light L1 and different from each other by 180 degrees at the different points.

It is to be noted that an irradiation position and an irradiation shape of each of the wavelengths, a division form of the plurality of pixel regions, and the number of divisions are arbitrary. Further, if the alignment directions of two directions that are parallel with the polarization axis Px of the incident light L1 and different from each other by 180 degrees are included in the irradiation region of each of the wavelengths, other alignment directions are arbitrary.

FIG. 23 illustrates an example of a relationship between the polarization axis Px of the incident light L1 and the alignment directions in the optical phase modulation element 1 according to the second embodiment.

FIG. 23 illustrates an example in which the pixel region 90 of the optical phase modulation element 1 is divided into four arranged in the horizontal direction, and the first pixel region 91, the second pixel region 92, the third pixel region 93, and a fourth pixel region 94 are formed in the horizontal direction. In the example in FIG. 23, each of the first pixel region 91 and the third pixel region 93 is the first alignment region where the alignment direction is the first direction (the −X direction) parallel with the polarization axis Px of the incident light L1. Each of the second pixel region 92 and the fourth pixel region 94 is the second alignment region where the alignment direction is the second direction (the X direction) parallel with the polarization axis Px of the incident light L1 and different from the first direction by 180 degrees.

For example, as illustrated in FIG. 23, a R (red color) light illumination region 90R, a G (green color) light illumination region 90G, and a B (blue color) light illumination region 90B may be set.

The R light illumination region 90R includes the entire first pixel region 91 and a portion of the second pixel region 92. The R light illumination region 90R is thereby set to include the first alignment region and the second alignment region.

The G light illumination region 90G includes a portion of the second pixel region 92 and a portion of the third pixel region 93. The G light illumination region 90G is thereby set to include the first alignment region and the second alignment region.

The B light illumination region 90B includes a portion of the third pixel region 93 and the entire fourth pixel region 94. The B light illumination region 90B is thereby set to include the first alignment region and the second alignment region.

Other configurations, operation, and effects may be substantially similar to those of the phase modulation device and the display apparatus according to the above-described first embodiment.

3. Third Embodiment

Next, a phase modulation device and a display apparatus according to a third embodiment of the present disclosure are described. It is to be noted that, in the following, components substantially the same as those of the phase modulation device and the display apparatus according to the above-described first or second embodiment are denoted by the same reference numerals, and the description thereof is omitted where appropriate.

In order to increase the interference and raise the diffraction efficiency, it is desirable that light that enters the optical phase modulation element 1 be linearly polarized light that is as nearly parallel with the alignment direction as possible. To this end, a polarization control means (a polarization control member) that adjusts a polarization state of the light that enters the optical phase modulation element 1 may be provided between the light source 50 and the optical phase modulation element 1.

FIG. 24 illustrates a first configuration example of the phase modulation device according to the third embodiment. FIG. 25 illustrates a second configuration example of the phase modulation device according to the third embodiment.

FIG. 24 illustrates a configuration example in which a polarizer 53 is disposed between the light source 50 and the optical phase modulation element 1 as the polarization control member. The polarizer 53 converts a polarization state of light emitted from the light source 50 to obtain linearly polarized light in which the direction of the polarization axis is parallel with the first direction and the second direction. For example, the polarizer 53 may be a polarizing plate or PBS.

FIG. 25 illustrates a configuration example in which a wave plate 54 using a birefringent material is disposed between the light source 50 and the optical phase modulation element 1 as the polarization control member. The wave plate 54 changes the polarization state of the light emitted from the light source 50 to increase a polarized component parallel with the first direction and the second direction. A linearly polarized component of the light emitted from the light source 50 is thereby maximized.

It is to be noted that the above-described polarizing plate and PBS each serving as the polarizer 53, and the wave plate 54 may be used in combination.

Other configurations, operation, and effects may be substantially similar to those of the phase modulation device and the display apparatus according to the above-described first or second embodiment.

4. Other Embodiments

The technology according to the present disclosure is not limited to the description of each of the foregoing embodiments, and may be modified in a variety of ways.

For example, the present technology may also include the following configurations.

According to the present technology of the following configurations, a plurality of pixel regions is formed in an optical phase modulation element, and optimization of an alignment direction for each of the pixel regions is achieved, and it is therefore possible to achieve uniformization of diffraction efficiency in the optical phase modulation element.

(1)
A phase modulation device including:
a light source; and
an optical phase modulation element including a plurality of pixels in each of which liquid crystal molecules are arrayed, and including a plurality of pixel regions each including the plurality of pixels, the optical phase modulation element modulating, for each of the pixels, a phase of incident light entering the plurality of pixel regions from the light source, in which
the optical phase modulation element includes, as the plurality of pixel regions,
at least one first alignment region where an alignment direction of the liquid crystal molecules is a first direction parallel with a polarization axis of the incident light, and
at least one second alignment region where an alignment direction of the liquid crystal molecules is a second direction parallel with the polarization axis of the incident light and different from the first direction by 180 degrees.

(2)
The phase modulation device according to (1), in which the optical phase modulation element further includes, as the plurality of pixel regions, at least one third alignment region where an alignment direction of the liquid crystal molecules is a third direction different from the first direction and the second direction.

(3)
The phase modulation device according to (2), in which an area of the third alignment region is 2% or less of an area of all the plurality of pixel regions.

(4)
The phase modulation device according to any one of (1) to (3), in which the light source is a coherent light source.

(5)
The phase modulation device according to any one of (1) to (4), in which the optical phase modulation element further includes an alignment control section that controls an alignment direction of the liquid crystal molecules in each of the plurality of pixel regions.

(6)
The phase modulation device according to (5), in which
the optical phase modulation element further includes a first substrate and a second substrate opposed to each other with the liquid crystal molecules interposed therebetween, and
the alignment control section is provided on an opposed surface of each of the first substrate and the second substrate.

(7)
The phase modulation device according to any one of (1) to (6), in which
the light source emits a plurality of light beams having wavelengths different from each other,
in the optical phase modulation element, a plurality of irradiation regions for the respective wavelengths is irradiated with the incident light, and
each of the plurality of irradiation regions is set to include the first alignment region and the second alignment region.

(8)
The phase modulation device according to any one of (1) to (7), further including a polarization control member that is disposed between the light source and the optical phase modulation element, and adjusts a polarization state of light emitted from the light source.

(9)
The phase modulation device according to (8), in which the polarization control member is a polarizer that converts the polarization state of the light emitted from the light source to obtain linearly polarized light in which a direction of a polarization axis is parallel with the first direction and the second direction.

(10)
The phase modulation device according to (8), in which the polarization control member is a wave plate that changes the polarization state of the light emitted from the light source to increase a polarized component parallel with the first direction and the second direction.

(11)
The phase modulation device according to any one of (1) to (10), in which a border between the plurality of pixel regions is shielded.

(12)
A display apparatus including:
a light source; and
an optical phase modulation element including a plurality of pixels in each of which liquid crystal molecules are arrayed, and including a plurality of pixel regions each including the plurality of pixels, the optical phase modulation element modulating, for each of the pixels, a phase of incident light entering the plurality of pixel regions from the light source, thereby reproducing a reproduced image, in which
the optical phase modulation element includes, as the plurality of pixel regions,
at least one first alignment region where an alignment direction of the liquid crystal molecules is a first direction parallel with a polarization axis of the incident light, and
at least one second alignment region where an alignment direction of the liquid crystal molecules is a second direction parallel with the polarization axis of the incident light and different from the first direction by 180 degrees.

(13)
The display apparatus according to (12), further including an optical intensity modulation element that uses the reproduced image reproduced by the optical phase modulation element as illumination light, and generates an image by performing intensity modulation on the illumination light.

This application claims priority from Japanese Patent Application No. 2018-093717 filed with the Japan Patent Office on May 15, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A phase modulation device, comprising:
    a light source; and
    an optical phase modulation element including a plurality of pixel regions, wherein
        each pixel region of the plurality of pixel regions includes a plurality of pixels,
        each pixel of the plurality of pixels includes an array of liquid crystal molecules,
        the optical phase modulation element is configured to modulate, for each pixel of the plurality of pixels, a phase of incident light that enters the plurality of pixel regions from the light source, and
        the plurality of pixel regions includes:
            a first alignment region in which an alignment direction of the liquid crystal molecules is a first direction parallel with a polarization axis of the incident light,
            a second alignment region in which the alignment direction of the liquid crystal molecules is a second direction parallel with the polarization axis of the incident light, wherein the second direction is different from the first direction by 180 degrees, and
            a third alignment region in which the alignment direction of the liquid crystal molecules is a third direction different from the first direction and the second direction.

2. The phase modulation device according to claim 1, wherein an area of the third alignment region is 2% or less of an area of the plurality of pixel regions.

3. The phase modulation device according to claim 1, wherein the light source is a coherent light source.

4. The phase modulation device according to claim 1, wherein the optical phase modulation element further includes an alignment control section configured to control the alignment direction of the liquid crystal molecules in each pixel region of the plurality of pixel regions.

5. The phase modulation device according to claim 4, wherein
    the optical phase modulation element further includes a first substrate and a second substrate opposed to the first substrate,
    the liquid crystal molecules are between the first substrate and the second substrate, and
    the alignment control section is on an opposed surface of each of the first substrate and the second substrate.

6. The phase modulation device according to claim 1, wherein
    the light source is configured to emit a plurality of light beams having a plurality of wavelengths,
    a wavelength of a first light beam of the plurality of light beams is different from a wavelength of a second light beam of the plurality of light beams,
    the optical phase modulation element further includes a plurality of irradiation regions for the plurality of wavelengths,
    the plurality of irradiation regions is irradiated with the plurality of light beams, and
    each irradiation region of the plurality of irradiation regions includes the first alignment region and the second alignment region.

7. The phase modulation device according to claim 1, further comprising a polarization control member between the light source and the optical phase modulation element, wherein the polarization control member is configured to adjust a polarization state of light emitted from the light source.

8. The phase modulation device according to claim 7, wherein the polarization control member is a polarizer configured to convert the polarization state of the light emitted from the light source to obtain linearly polarized light in which a direction of the polarization axis is parallel with the first direction and the second direction.

9. The phase modulation device according to claim 7, wherein the polarization control member is a wave plate configured to change the polarization state of the light emitted from the light source to increase a polarized component parallel with the first direction and the second direction.

10. The phase modulation device according to claim 1, wherein a border between the plurality of pixel regions is a shielded border.

11. A display apparatus, comprising:
    a light source; and
    an optical phase modulation element including a plurality of pixel regions, wherein
        each pixel region of the plurality of pixel regions includes a plurality of pixels,
        each pixel of the plurality of pixels includes an array of liquid crystal molecules,
        the optical phase modulation element is configured to:
            modulate, for each pixel of the plurality of pixels, a phase of incident light that enters the plurality of pixel regions from the light source; and
            reproduce a reproduced image based on the modulation of the phase of the incident light, and
        the plurality of pixel regions includes:
            a first alignment region in which an alignment direction of the liquid crystal molecules is a first direction parallel with a polarization axis of the incident light,
            a second alignment region in which the alignment direction of the liquid crystal molecules is a second direction parallel with the polarization axis of the incident light, wherein the second direction is different from the first direction by 180 degrees, and
            a third alignment region in which the alignment direction of the liquid crystal molecules is a third direction different from the first direction and the second direction.

12. The display apparatus according to claim 11, further comprising an optical intensity modulation element configured to:
    use the reproduced image as illumination light; and
    execute intensity modulation on the illumination light to generate an image.

13. A phase modulation device, comprising:
    a light source; and an optical phase modulation element including a plurality of pixel regions, wherein
 each pixel region of the plurality of pixel regions includes a plurality of pixels,
 each pixel of the plurality of pixels includes an array of liquid crystal molecules,
 the optical phase modulation element is configured to modulate, for each pixel of the plurality of pixels, a phase of incident light that enters the plurality of pixel regions from the light source,
 the plurality of pixel regions includes:
  a first alignment region in which an alignment direction of the liquid crystal molecules is a first direction parallel with a polarization axis of the incident light, and
  a second alignment region in which the alignment direction of the liquid crystal molecules is a second direction parallel with the polarization axis of the incident light, wherein the second direction is different from the first direction by 180 degrees, and
 a border between the plurality of pixel regions is a shielded border.

\* \* \* \* \*